(12) United States Patent
Kodate et al.

(10) Patent No.: US 7,034,904 B2
(45) Date of Patent: Apr. 25, 2006

(54) LIQUID CRYSTAL DISPLAY

(75) Inventors: Manabu Kodate, Yokohama (JP); Hiroshi Nakasima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 10/420,668

(22) Filed: Apr. 22, 2003

(65) Prior Publication Data
US 2003/0201963 A1    Oct. 30, 2003

(30) Foreign Application Priority Data
Apr. 30, 2002    (JP)    ............................. 2002-129358

(51) Int. Cl.
*G02F 1/136*    (2006.01)
(52) U.S. Cl. ....................................... 349/48
(58) Field of Classification Search ................... 349/48
See application file for complete search history.

(56) References Cited

U.S. PATENT DOCUMENTS

| 5,191,451 | A | * | 3/1993 | Katayama et al. | ............. 349/48 |
| 5,285,302 | A | * | 2/1994 | Wu | ............... 349/43 |
| 5,701,166 | A | * | 12/1997 | Fedorovish et al. | .......... 349/38 |
| 6,067,132 | A | * | 5/2000 | Kim | ............................ 349/47 |
| 6,191,831 | B1 | * | 2/2001 | Kim et al. | ..................... 349/43 |
| 6,317,174 | B1 | * | 11/2001 | Noumi et al. | ................. 349/42 |
| 6,850,302 | B1 | * | 2/2005 | Song | ........................... 349/129 |
| 6,862,052 | B1 | * | 3/2005 | Kim | ............................. 349/54 |

FOREIGN PATENT DOCUMENTS

| JP | PUPA 05-188395 | 7/1993 |
| JP | PUPA 05-265045 | 10/1993 |
| JP | PUPA 05-303114 | 11/1993 |
| JP | PUPA 09-120083 | 5/1997 |
| JP | PUPA 09-281465 | 10/1997 |
| JP | PUPA 14-122880 | 4/2002 |
| KR | PUPA 1999-87973 | 12/1999 |

* cited by examiner

*Primary Examiner*—James A. Dudek
(74) *Attorney, Agent, or Firm*—Arthur J. Samodovitz

(57) ABSTRACT

Portions of a liquid crystal layer and an alignment layer in an LCD which are electrically connected to a scan signal line or to a gate electrode are protected from exposure. Such an LCD can be formed from a five step photo lithographic process. Pixel electrodes A11 and B11 are connected to a common display signal line Dm. TFTs M1 and M2 are connected in series between the pixel electrode A11 and the display signal line Dm. A TFT M3 is connected between the pixel electrode B11 and the display signal line Dm. TFTs M1 and M3 use a scan signal line Gn+1 as respective gate electrodes thereof. TFT M2 uses a scan signal line Gn+2' branched from a scan signal line Gn+2 as a gate electrode thereof. The scan signal lines Gn+1 and Gn+2' are arranged parallel to each other inside a display region. The semiconductor layer structure of the LCD is also disclosed.

10 Claims, 20 Drawing Sheets

PRIOR ART

PRIOR ART

PRIOR ART

LIQUID CRYSTAL DISPLAY

BACKGROUND OF THE INVENTION

The present invention relates generally to liquid crystal displays (LCDs), and deals more specifically with an LCD which has sensitive regions protected by insulating and/or passivation layers.

Active-matrix-type LCDs use thin-film transistors (TFTs) as switching elements. An active-matrix-type LCD includes a TFT array substrate in which scan signal lines and display signal lines are arranged in the form of matrix. TFTs are arranged on intersection points thereof, and a color filter substrate is located at a predetermined distance from the TFT array substrate. A liquid crystal material is filled between the TFT array substrate and the color filter substrate. The TFTs supply voltages to the liquid crystal material, and cause luminance due to electro-optic effect of the liquid crystal.

As the number of pixels increase to improve definition of an active-matrix-type LCD, the following problems have arisen. The number of display signal lines and scan signal lines have significantly increased along with the number of pixels and the number of driver ICs. This has increased cost and complexity. Also, an electrode pitch at which a driver IC and a TFT array substrate are connected has narrowed, whereby the connections have become difficult and the yield has been reduced.

Many solutions have been proposed to reduce the number of circuit components. For example, an electric potential can be supplied from one display signal line to two or more adjacent pixels in a row. The signal for each pixel is provided in a time-division multiplexed manner to reduce the number of driver ICs. See U.S. patent application Ser. No. 10/317,503 filed Dec. 12, 2002 by K. Abe, E. Kanzaki and M. Kodate, Japanese Unexamined Patent Publications No. Hei 6(1994)-138851, No. Hei 6(1994)-148680, No. Hei 11(1999)-2837, No. Hei 5(1993)-265045, No. Hei 5(1993)-188395, and No. Hei 5(1993)-303114, for example.

A TFT array substrate with the multiplexed IC drivers can be manufactured using a photo engraving process (hereinafter referred to as photolithography). A TFT array substrate can be made in a seven step photo lithographic process using conventional technology. Attempts have been made to reduce the number of photo lithographic steps to five, but problems have arisen. In the five step process, a portion of the liquid crystal layer or an alignment layer electrically connected to a scan signal line or to a gate electrode is exposed. This phenomenon is described in detail below, and is hereinafter referred to as "gate potential" exposure. This exposure adversely affects image characteristics.

This problem is illustrated by FIGS. 17–20, in which a multiplexed pixel display device 22 was manufactured using a conventional, five step (or "reduced") photolithographic-step process. FIG. 17 is an equivalent circuit diagram showing the multiplex pixel display device 22. Pixel electrodes A100 and B100 are adjacent to each other across a display signal line Dm. There are three switching TFTs—M1, M2 and M3 arranged as follows. Source and drain electrodes of TFT M1 are respectively connected to the display signal line Dm and the pixel electrode A100. A gate electrode of TFT M1 is connected to a source electrode of TFT M2. In the illustrated example, a TFT source terminal is connected to a display signal line Dm and a TFT drain terminal is connected to a pixel electrode. However, the drain and source terminals can also be reversed with analogous operation. Therefore, in the following description, both the source and drain terminals will be referred to as a source/drain terminal or electrode.

The source/drain electrodes of TFT M2 are respectively connected to the gate electrode of TFT M1 and a scan signal line Gn+2. Therefore, the gate electrode of TFT M1 is connected to the scan signal line Gn+2 through the second TFT M2. A gate electrode of TFT M2 is connected to a scan signal line Gn+1. Accordingly, only for a period when the two adjacent scan signal lines Gn+1 and Gn+2 are simultaneously at a selection potential (hereinafter referred to as "selected"), TFT M1 is turned on. Thereby an electric potential of the display signal line Dm is supplied to the pixel electrode A100.

Source/drain electrodes of TFT M3 are respectively connected to the display signal line Dm and the pixel electrode B100. A gate electrode of TFT M3 is connected to the scan signal line Gn+1. Accordingly, when the scan signal line Gn+1 is selected, TFT M3 is turned on. Thereby the electric potential of the display signal line Dm is supplied to the pixel electrode B100.

FIG. 18 is a plan view schematically illustrating a semiconductor configuration in the vicinity of pixel electrodes C100 and D100 of the multiplex pixel display device 22 shown in FIG. 17. As described above, the multiplexed pixel display device 22 is manufactured using photolithography. In FIG. 18, the same shade is applied in layers prepared through the same photo lithographic step. The shade also shows the order of process step. A lighter shade shows a preceding step. It can be seen that the scan signal lines Gn+1 and Gn+2, for example, are formed prior to the display signal line Dm.

In FIG. 18, TFT M1 has the source/drain electrode 51 which is connected to the pixel electrode A100, the source/drain electrode 61 which is connected to the display signal line Dm, and the gate electrode 71. TFT M2 has the source/drain electrode 52 which is connected to the gate electrode 71 of TFT M1 through a connector 81, the source/drain electrode 62 which is connected to the scan signal line Gn+2, and the gate electrode 72, which is part of the scan signal line Gn+1. A branched line 83 is connected to the scan signal line Gn+2 through a connector 82. Part of the branched line 83 constitutes the source/drain electrode 62.

FIG. 19 is a cross-sectional view taken along the line Z—Z in FIG. 18. Note that a scale of FIG. 19 is different than that of FIG. 18. The scan signal lines Gn+1 and Gn+2 and the gate electrode 71 are formed on a glass substrate 95. A gate insulating film 94, which covers the scan signal lines Gn+1 (gate electrode 72) and Gn+2, and the gate electrode 71, is formed on the glass substrate 95. On the gate insulating film 94, semiconductor layers 931 and 932 are formed at portions relevant to TFTs M1 and M2. The source/drain electrodes 51 and 61 are formed on the semiconductor layer 931 and constitute TFT M1 together with a channel protection film 96. In addition, the source/drain electrodes 52 and 62 are formed on the semiconductor layer 932 and constitute TFT M2 together with a channel protection film 96. Furthermore, a passivation film 91 is stacked on these films. On the gate electrode 71, a contact hole 97, penetrating the gate insulating film 94 and the passivation film 91, is formed. Meanwhile, on the source/drain electrode 52, a contact hole 98 penetrating the passivation film 91 is formed. The connector 81 enters into the contact holes 97 and 98, whereby the source/drain electrode 52 and the gate electrode 71 are electrically connected. A contact hole 100 penetrating the gate insulating film 94 and the passivation film 91 is formed on scan signal line Gn+2. Meanwhile, a contact hole 99 penetrating the passivation film 91 is formed on the source/ drain electrode 62. The connector 82 enters into the contact holes 99 and 100, whereby the source/drain electrode 62 and the scan signal line Gn+2 are electrically connected. The passivation film 91 is not formed on the connectors 81 and 82. Therefore, the gate electrode 71 and the scan signal line Gn+2 are exposed outside through the connectors 81 and 82, respectively. Although not shown in FIG. 19, an alignment film is generally formed on the passivation film 91, and moreover, a liquid crystal layer is provided on the alignment film. Accordingly, the gate electrode 71 and the scan signal line Gn+2 are in electrical contact with the alignment film. In such a structure, when an electric potential (gate potential) is supplied to the gate electrode 71 and the scan signal line Gn+2, electric charges are endlessly supplied to the alignment film in a region where the connectors 81 and 82 are in contact with the alignment film. Accordingly, impurity ions present in the liquid crystal layer concentrate in this region, whereby a voltage drop or an electric charge retention failure occurs and this causes deterioration in image quality.

FIGS. 20(a) to 20(e) illustrate a process in which the display device 22 is manufactured by the conventional five step/reduced photo lithographic process.

First, a metal film to form the scan signal lines Gn+1 (gate electrode 72) and Gn+2 is formed on the glass substrate 95. After the metal film is formed, the gate electrode 71 and the scan signal lines Gn+1 (gate electrode 72) and Gn+2 are patterned by photolithography as shown in FIG. 20(a).

Next, the gate insulating film 94 and a semiconductor layer 93 are formed on the glass substrate 95 on which the gate electrode 71 and the scan signal lines Gn+1 (gate electrode 72) and Gn+2 are formed. Moreover, a film to form the channel protection films 96 is formed on the semiconductor layer 93. Thereafter, as shown in FIG. 20(b), the channel protection films 96 are patterned on the semiconductor layer 93 by photolithography.

Next, a metal film to form the source/drain electrodes 51, 61, 52, and 62 and the branched line 83 is formed. After this metal film is formed, the source/drain electrodes 51, 61, 52, and 62, the branched line 83, and the semiconductor layers 931 and 932 are patterned by photolithography as shown in FIG. 20(c).

Next, the passivation films 91 is formed as follows. The passivation film 91 is patterned by photolithography as shown in FIG. 20(d). At the time of this patterning, the contact holes 97, 98, 99, and 100 are formed.

After the passivation film 91 is formed, a film, for example, an indium tin oxide (ITO) film, to form the pixel electrodes is formed by sputtering. The connectors 81 and 82 are also prepared using this ITO film. After the ITO film is formed, the connectors 81 and 82 are patterned by photolithography as shown in FIG. 20(e).

In the display device 22, there are two portions where the gate potential exposure occurs: a connecting portion between the first and second TFTs M1 and M2 and a connecting portion between the branched line 83 and the scan signal line Gn+2. These two portions and gate potential exposures occur at every pixel electrode. The gate electrode 71 of TFT M1 and the source/drain electrode 52 of TFT M2 are connected through the connector 81. Moreover, the branched line 83 and the scan signal line Gn+2 are connected through the connector 82.

The reason why connection using the connectors 81 and 82 is required is that the gate electrode 71 and the scan signal line Gn+2 are respectively formed through photo lithographic steps different from those of the source/drain electrode 52 and the branched line 83 and then the contact holes are formed. For example, if the connector 81 is formed prior to the passivation film 91, the gate potential exposure can be prevented, but there is no room to insert the connector 81 prior to the passivation film 91 in a case of the five-photolithographic-step process described with reference to FIGS. 20A to 20E.

An object of the present invention is to provide a technology which prevents portions electrically connected to a scan signal line or a gate electrode from being exposed on a liquid crystal layer or on an alignment layer in a multiplex pixel display device even in a case of use of a reduced-photolithographic-step process.

Another object of the present invention is to provide a liquid crystal display device which use this technology.

SUMMARY OF THE INVENTION

The present invention resides in an image display device having pixel electrodes arranged in rows and columns of a matrix. The image display device includes a plurality of display device elements arranged in the column direction. Each display device element includes a plurality of display signal lines for transmitting a display signal; first and second pixel electrodes which are supplied with the display signal transmitted through the display signal line common thereto time-divisionally; first and second switching elements provided between the common display signal line and the first pixel electrode; a third switching element provided between the common display signal line and the second pixel electrode; a first scan signal line for transmitting a scan signal to the first and third switching elements; and a second scan signal line, which is provided parallel to the first scan signal line, for transmitting a scan signal to the second switching element. Moreover, the second scan signal line is branched from the first scan signal line in the display device element.

In the image display device of the present invention, the second scan signal line may be branched from the first scan signal line in the display device element located downstream of that of the second scan signal line. Also, a storage capacitor may be included between each of the first and second pixel electrodes in the display device element and the first scan signal line in the display device element located upstream of that of the first and second pixel electrodes.

Also in the present invention, the first and second switching elements may be connected in series between the first pixel electrode and the display signal line. In this case, the image display device may include a passivation film layer for protecting the second switching element, and part of the second scan signal line connected to the second switching element may be formed on the passivation film layer.

Also in the present invention, the second scan signal line may be provided between the first scan signal line and the first and second pixel electrodes, and intersect with the first scan signal line outside an image display region. In this case, the image display device may include a passivation film layer for protecting the second switching element, and part of the second scan signal line connected to the second switching element may be formed on the passivation film layer outside the image display region.

An image display apparatus having a more specific configuration of the present invention is an image display apparatus including an image display region in which pixel electrodes are arranged in the form of matrix in row and column directions, and an image non-display region located around the image display region. The image display apparatus includes a display signal supplying circuit for supplying display signals; a scan signal supplying circuit for supplying scan signals; a plurality of display signal lines, which are parallel to each other, for transmitting the display signals, which are supplied from the display signal supplying circuit, to the pixel electrodes; a plurality of scan signal lines, which are parallel to each other, for transmitting the scan signals, which are supplied from the scan signal supplying circuit, to the pixel electrodes; first and second pixel electrodes which are located between the nth (n is a positive integer) scan signal line and the (n+1)th scan signal line and which receive the display signals from a predetermined one of the display signal lines; first and second switching elements connected in series between the predetermined display signal line and the first pixel electrode; and a third switching element connected between the predetermined display signal line and the second pixel electrode. The scan signal transmitted through the (n+1)th scan signal line controls ON and OFF of the first and third switching elements, and the scan signal transmitted through a branched scan signal line which is branched from the (n+2)th scan signal line located downstream of the (n+1)th scan signal line controls ON and OFF of the second switching element.

The image display apparatus of the present invention may have a configuration in which the branched scan signal line branched from the (n+2)th scan signal line in the image non-display region includes a first portion that extends in the column direction in the image non-display region and a second portion that is connected to the first portion to extend in the row direction, and in which the branched scan signal line intersects with the (n+1)th scan signal line in the image non-display region.

Furthermore, the present invention provides, as an image display apparatus having a more specific configuration of the present invention, an image display apparatus including an image display region in which pixel electrodes are arranged in the form of matrix in row and column directions and an image non-display region located around the image display region. The image display apparatus includes a display signal supplying circuit for supplying display signals; a scan signal supplying circuit for supplying scan signals; a plurality of display signal lines, which are parallel to each other, for transmitting the display signals, which are supplied from the display signal supplying circuit, to the pixel electrodes; a plurality of scan signal lines, which are parallel to each other, for transmitting the scan signals, which are supplied from the scan signal supplying circuit, to the pixel electrodes; first and second pixel electrodes which are located between the nth (n is a positive integer) scan signal line and the (n+1)th scan signal line and which receive the display signals from a predetermined one of the display signal lines; first and second switching elements connected in series between the predetermined display signal line and the first pixel electrode; and a third switching element connected between the predetermined display signal line and the second pixel electrode. The scan signal transmitted through the nth scan signal line controls ON and OFF of the first and third switching elements, and the scan signal transmitted through a branched scan signal line which is branched from the (n+1)th scan signal line controls ON and OFF of the second switching element.

The present invention also resides in the semiconductor structure of the foregoing LCDs made in a five or less/reduced step photo lithographic process. The semiconductor structure of the LCD comprises a substrate, a first gate electrode of a first TFT and a second gate electrode of a second TFT. The first and second gate electrodes are adjacent to other on the substrate. An insulating film is formed over the first and second gate electrodes. A semiconductor layer is formed over the insulating film. There is a first source/drain electrode for the first TFT opposite the second TFT, a second source/drain electrode for the second TFT opposite the first TFT, and a third source/drain electrode between and common to both the first and second TFTs. The first, second and third source/drain electrodes are formed on the semiconductor layer. A passivation layer is formed on (i) the first, second and third source/drain electrodes, (ii) a region of the insulating layer peripheral to the first and second TFTs, and (iii) a side edge of the first source/drain electrode peripheral to the first TFT. The passivation layer has a gap over a region of the first source/drain electrode peripheral of the first gate. A pixel electrode is formed on (a) a first portion of the passivation layer which is formed on the insulating layer, (b) a second portion of the passivation layer which is formed on the side edge and (c) the first source/drain electrode through the gap in the passivation layer. Other circuitry is provided for supplying control signals to the first and second gate electrodes.

DETAILED DESCRIPTION OF THE PREFERRED EMBODIMENTS OF THE PRESENT INVENTION

Figure 1:
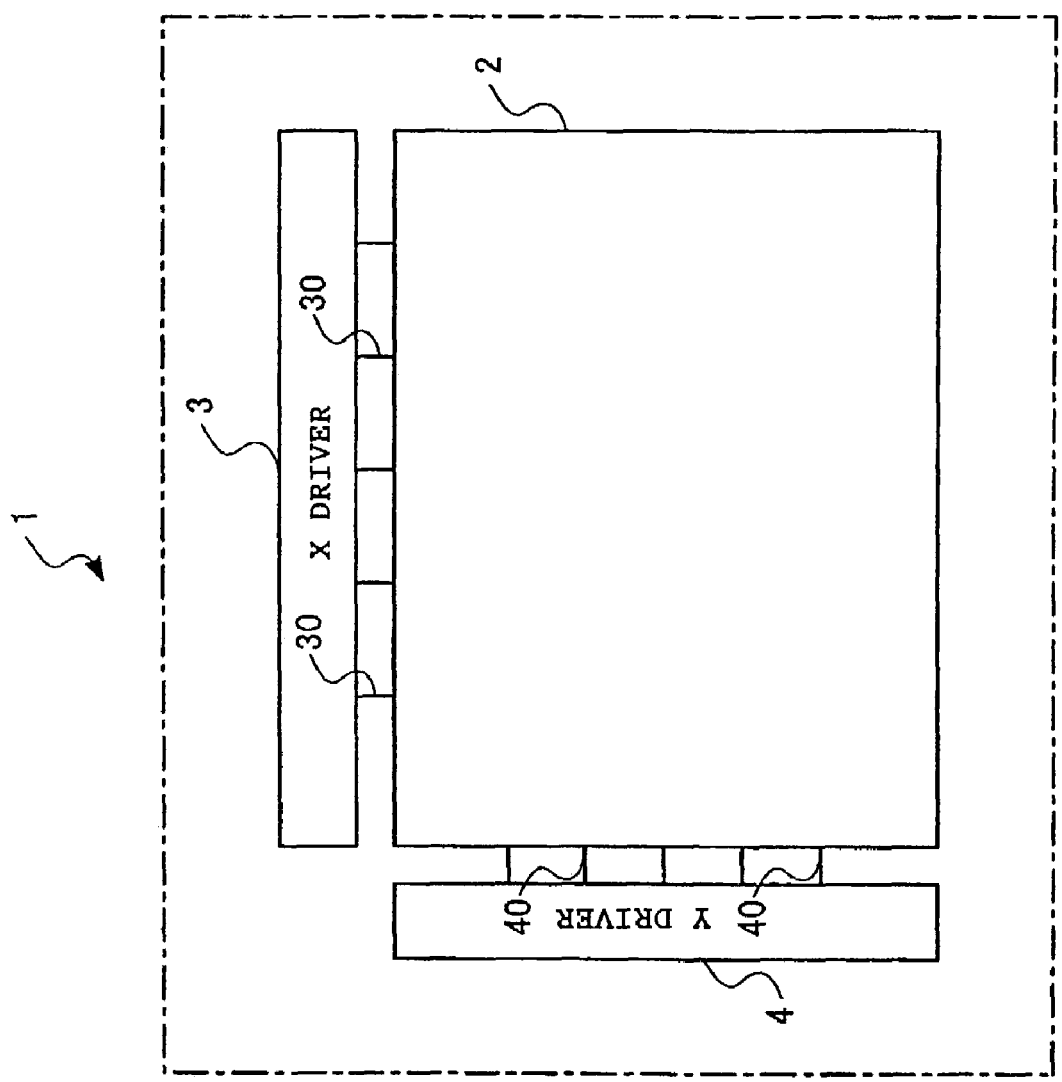
FIG. 1 is a block diagram showing an LCD according to a first embodiment of the present invention.

Referring now to the drawings wherein like reference numbers indicate like elements throughout, FIG. 1 illustrates an LCD system generally designated 1 according to first embodiment of the present embodiment. As explained below, in LCD system 1, pairs of pixels adjacent to each other across one common display signal line share a relevant display signal line in a time division, multiplexed manner. Thereby the number of display signal lines is reduced by half. Also, in LCD system 1 there is no gate potential exposure in a display region. LCD system 1 comprises a TFT array substrate, a color filter substrate facing toward the TFT array substrate, and a backlight unit. However, the TFT array substrate, color filter substrate and backlight unit are well known in the art and will not be discussed in detail herein.

LCD system 1 comprises an X driver 3 and a Y driver 4 in addition to LCD 2. X driver 3 is a driver circuit for supplying display signals to pixel electrodes arranged in the LCD 2 through display signal lines 30. Y driver 4 is a driver circuit for supplying scan signals controlling ON and OFF of TFTs through scan signal lines 40. Here, "supplying display signals to pixel electrodes" means applying electric potentials to pixel electrodes to cause them to luminesce. In the LCD 2, M×N pixels are arranged in the form of matrix. The X and Y drivers 3 and 4 are connected to a timing controller (not shown). This timing controller receives digital video data which comprises the display signals, synchronous signals, clock signals, and the like from a system side, such as a personal computer, to control operations of the X and Y drivers 3 and 4.

Figure 2:
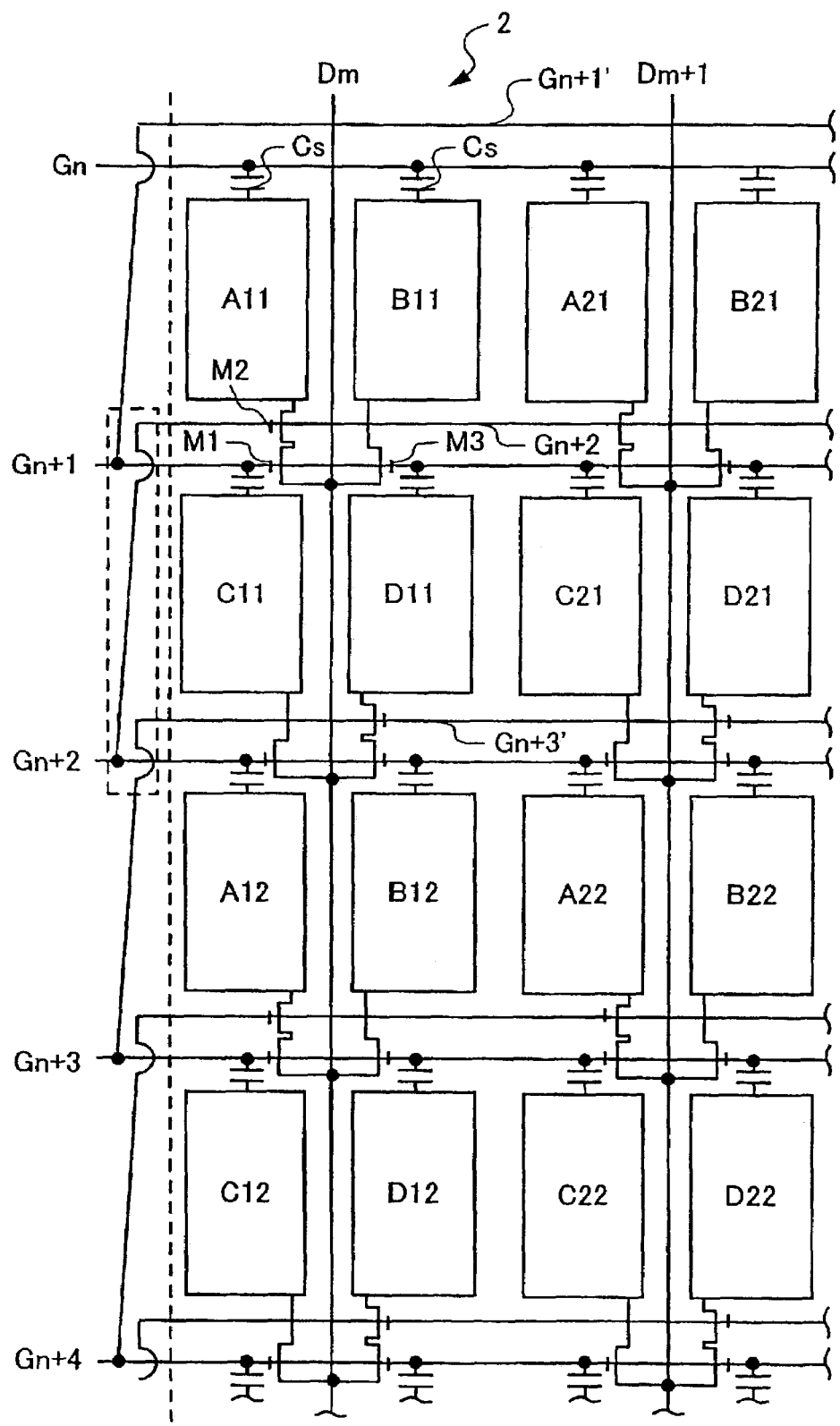
FIG. 2 is a circuit diagram of the LCD of FIG. 1.

FIG. 2 illustrates a circuit configuration of part of LCD 2. In the complete LCD 2, there are many of the circuits illustrated in FIG. 2. A dotted line drawn on the left of the pixel electrodes A11, C11, A12, . . . shows a boundary between an image display region and an image non-display region in the display device 2. A region on the right of the dotted line is the image display region. Pixel electrodes A11 and B11 are adjacent to each other across a display signal line Dm. There are three TFTs—M1, M2 and M3, arranged as follows.

Source/drain electrodes of TFT M1 are respectively connected to the display signal line Dm and one source/drain electrode of TFT M2. Part of a scan signal line Gn+1 (first scan signal line) constitutes a gate electrode of TFT M1. Source/drain electrodes of TFT M2 are respectively connected to one source/drain electrode of TFT M1 and the pixel electrode A11. Part of a scan signal line Gn+2' (second scan signal line) branched from a scan signal line Gn+2 (third scan signal line) constitutes a gate electrode of TFT M2. TFTs M1 and M2 have the above-described connection relationship. Accordingly, only during a period when the two adjacent scan signal lines Gn+1 and Gn+2 are simultaneously at a selection potential, TFTs M1 and M2 are turned on. Thereby an electric potential of the display signal line Dm is supplied to the pixel electrode A11. Source/drain electrodes of TFT M3 are respectively connected to the display signal line Dm and the pixel electrode B11. Part of the scan signal line Gn+1 constitutes a gate electrode of TFT M3. Accordingly, during a period when the scan signal line Gn+1 is at the selection potential, TFT M3 is turned on. Thereby the electric potential of the display signal line Dm is supplied to the pixel electrode B11.

In the LCD 2, the pixel electrodes A11 and B11 are supplied with display signals through the single common display signal line Dm. In other words, the display signal line Dm is a display signal line common to the pixel electrodes A11 and B11. Therefore, while pixels are arranged in an M×N matrix, the number of display signal lines Dm is M/2. TFTs M1 and M2 are connected to the pixel electrode A11, and TFT M1 is connected to the display signal line Dm as well as to TFT M2. The gate electrode of TFT M1 is connected to the scan signal line Gn+1. Moreover, the gate electrode of TFT M2 is connected to the scan signal line Gn+2' branched from the scan signal line Gn+2 located downstream of the scan signal line Gn+1. Here, the scan signal lines Gn+2 and Gn+2' are arranged in parallel to each other in the image display region. The scan signal lines Gn+2 and Gn+2' are drawn as a single line from the Y driver 4 and branched in the image non-display region. Therefore, the scan signal lines Gn+2 and Gn+2' are originally the single line but transmit scan signals to pixel electrodes corresponding to mutually different rows. The same applies to a pair of scan signal lines Gn+1 and Gn+1' and a pair of scan signal lines Gn+3 and Gn+3'. In other words, a plurality of scan signal lines in the display device 2 consist of a set of the pair of scan signal lines Gn+1 and Gn+1' and the like. Moreover, the scan signal lines Gn+1 and Gn+2' are located downstream of the pixel electrode A11 in a scan direction. The scan signal line Gn+2' is located closer to the pixel electrode A11 than the scan signal line Gn+1. Furthermore, a storage capacitor Cs is formed between the pixel electrode A11 and the scan signal line Gn located upstream of the pixel electrode A11.

Figure 3:
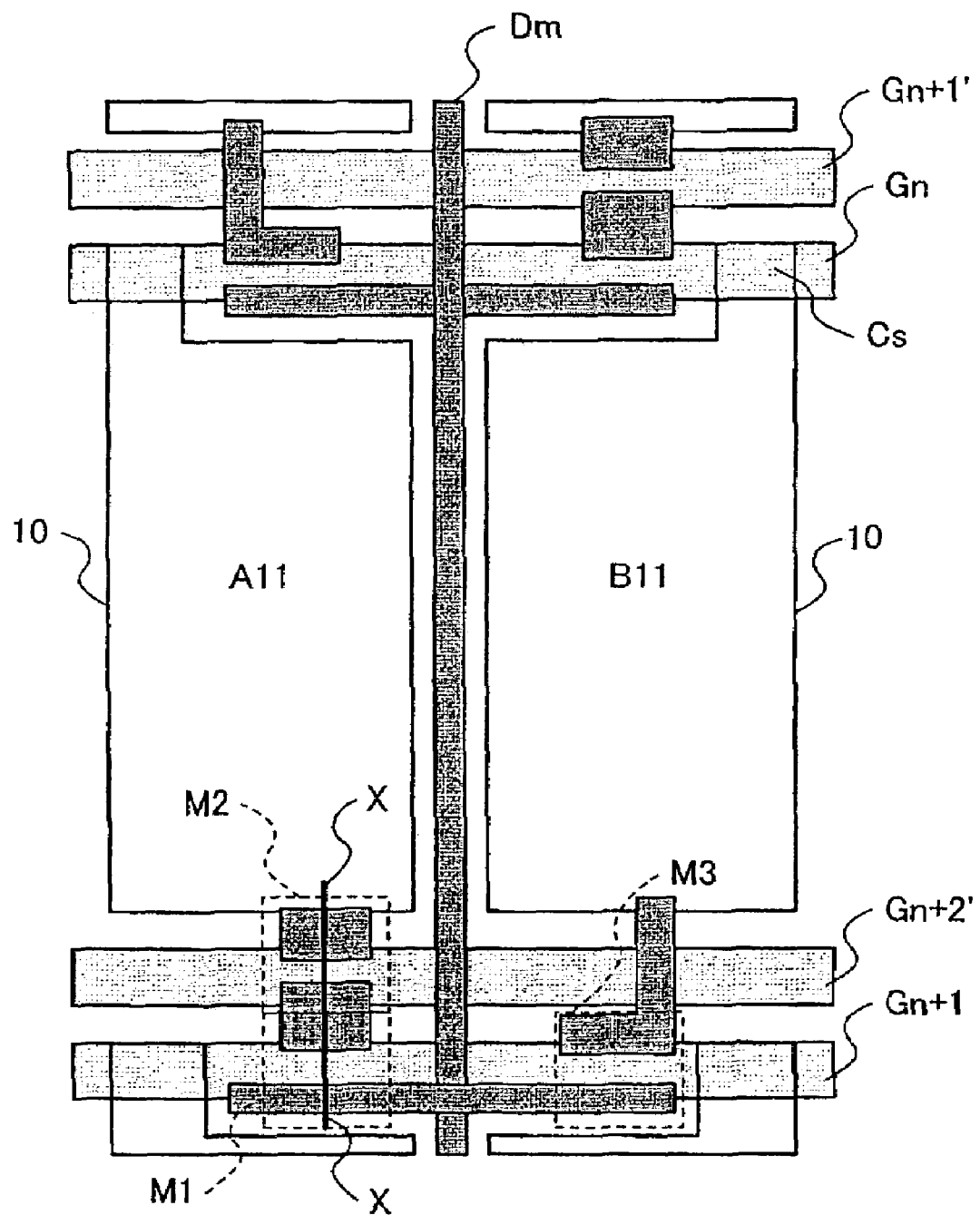
FIG. 3 is a partial plan view of a semiconductor configuration of the LCD of FIG. 1.

FIG. 3 is a partial plan view schematically showing the circuit configuration of LCD 2 according to the present embodiment. In relation to the pixel electrode A11 (10), the TFTs M1 and M2 are respectively located on the scan signal lines Gn+1 and Gn+2'. In relation to the pixel electrode B11 (10), TFT M3 is located on the scan signal line Gn+1. In other words, TFTs M1 and M3 use part of the scan signal line Gn+1 as the respective gate electrodes thereof, and TFT M2 uses part of the scan signal line Gn+2' as the gate electrode thereof. Note that a passivation film is not shown in FIG. 3, but will be shown in FIG. 4.

Figure 4:
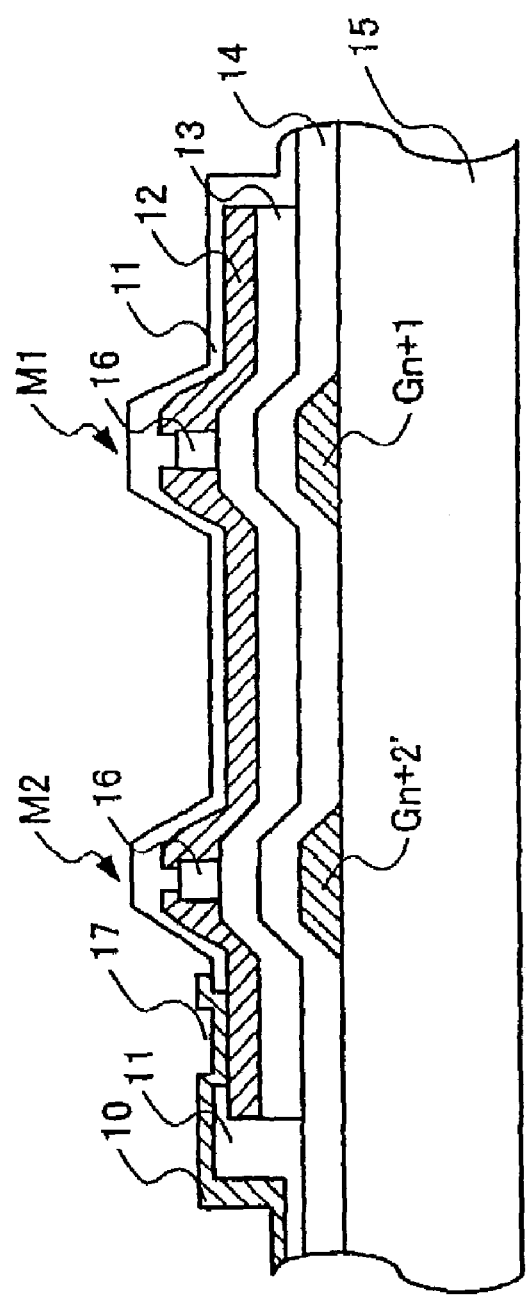
FIG. 4 is a partial cross-sectional view of a semiconductor configuration of the LCD of FIG. 1.

FIG. 4 shows a cross-section taken along the line X—X in FIG. 3. As shown in FIG. 4, the scan signal lines Gn+1 and Gn+2' are formed on a glass substrate 15. On the glass substrate 15, a gate insulating film 14 covers the scan signal lines Gn+1 and Gn+2'. A semiconductor layer 13 is formed in a predetermined region on the gate insulating film 14. On the semiconductor layer 13, a source/drain layer 12 is formed with the exclusion of regions where channel protection films 16 are formed. Furthermore, a passivation film 11 is formed on the source/drain layer 12. Based on the above-described stacked structure, TFTs M1 and M2 are formed. A contact hole 17 is provided in the passivation film 11 at a TFT M2 side. The pixel electrode 10 and the source/drain layer 12 constituting TFT M2 are electrically connected through the contact hole 17.

Figure 5:
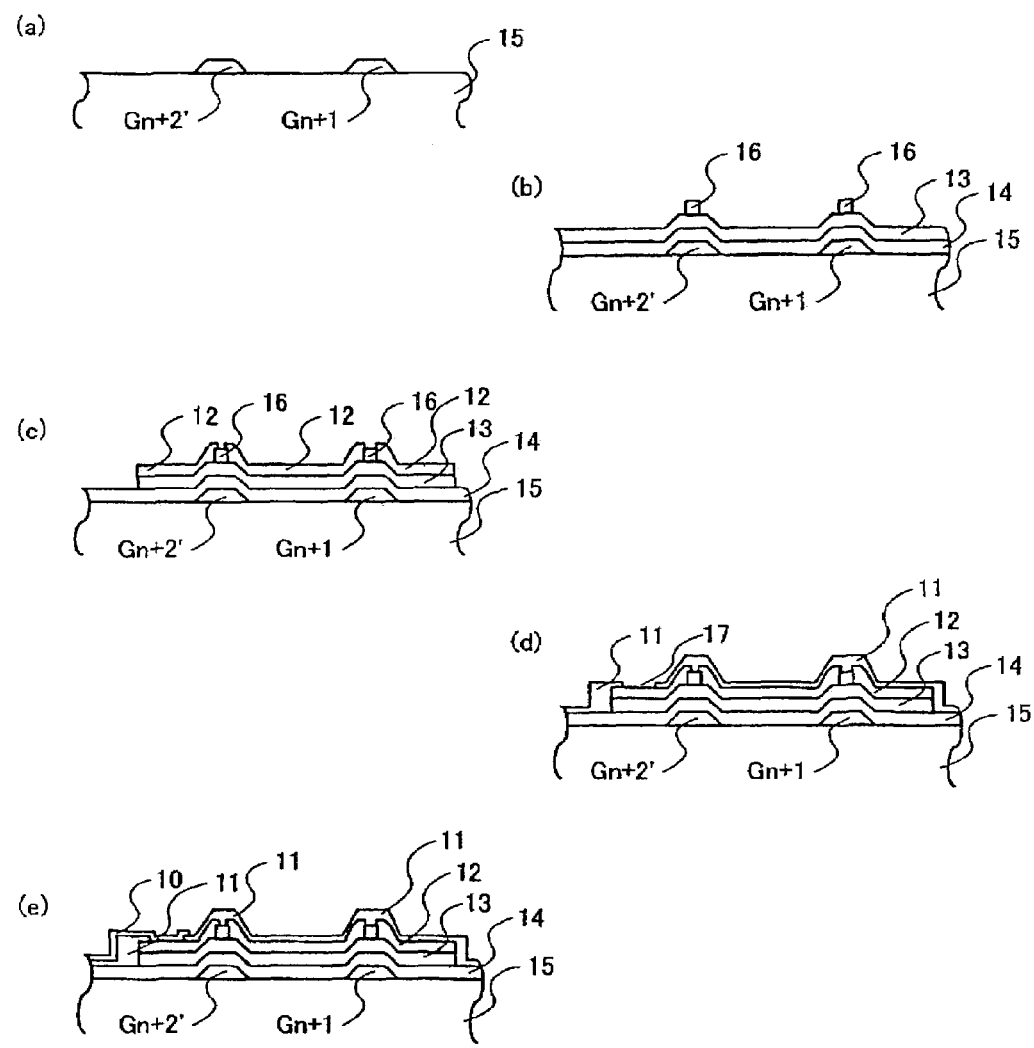
FIGS. 5(*a–e*) illustrate steps of a manufacturing process for the LCD of FIG. 1.

FIGS. 5(a–e) illustrate a manufacturing process for a portion of the LCD 2 corresponding to FIG. 4. First, a metal film from which to form the scan signal lines Gn+1 and Gn+2' is formed on the glass substrate 15, for example, by sputtering. Ta, Mo—Ta alloy, Mo—W alloy, Al, or the like can be used as a material forming the metal film. After the metal film is formed, the scan signal lines Gn+1 and Gn+2' are patterned as shown in FIG. 5(a) by a photo engraving process called photolithography.

Next, as illustrated in FIG. 5(b), a gate insulating film 14 comprised of an SiO$_2$ film or a Si$_3$N$_4$ film, for example, is formed on glass substrate 15 over the scan signal lines Gn+1 and Gn+2'. Next, a semiconductor layer 13 comprised of an a-Si (amorphous silicon) film, for example, is formed on a gate insulating film 14. Next, a channel protection film comprised of a Si$_3$N$_4$ film, for example, is formed on the a-Si film. After these three films are formed, for example by CVD (chemical vapor deposition), the channel protection film is patterned into channel protection film portions 16,16 on the gate insulating film 14 and the semiconductor layer 13 by photolithography.

Next, as shown in FIG. 5(c), a metal film to form the source/drain layer 12 is formed by, for example, sputtering. Al, Ti, Mo, or the like can be used as a material forming the metal film. After the metal film is formed, the source/drain layer 12 and the semiconductor layer 13 are patterned by photolithography.

Next, as shown in FIG. 5(d), a Si$_3$N$_4$ film, for example, to form the passivation film 11 is formed by CVD. Also, the passivation film 11 is patterned by photolithography. At the time of this patterning, the contact hole 17 is formed.

Next, as shown in FIG. 5(e), (after the passivation film 11 is formed) an Indium Tin Oxide (ITO) film, for example, to form the pixel electrode 10 is formed by sputtering. After the ITO film is formed, the pixel electrode 10 is patterned by photolithography. Therefore, there is no gate potential exposure at TFT M1 and TFT M2. Although not shown, the manufacturing process for TFT M3 is similar, and there will no gate potential exposure at TFT M3.

Thus, as shown in FIG. 4 and FIGS. 5(a–e), in the LCD 2, the gate potential exposure does not occur in the display region even in a case of a five step photolithographic-step process.

Figure 6:
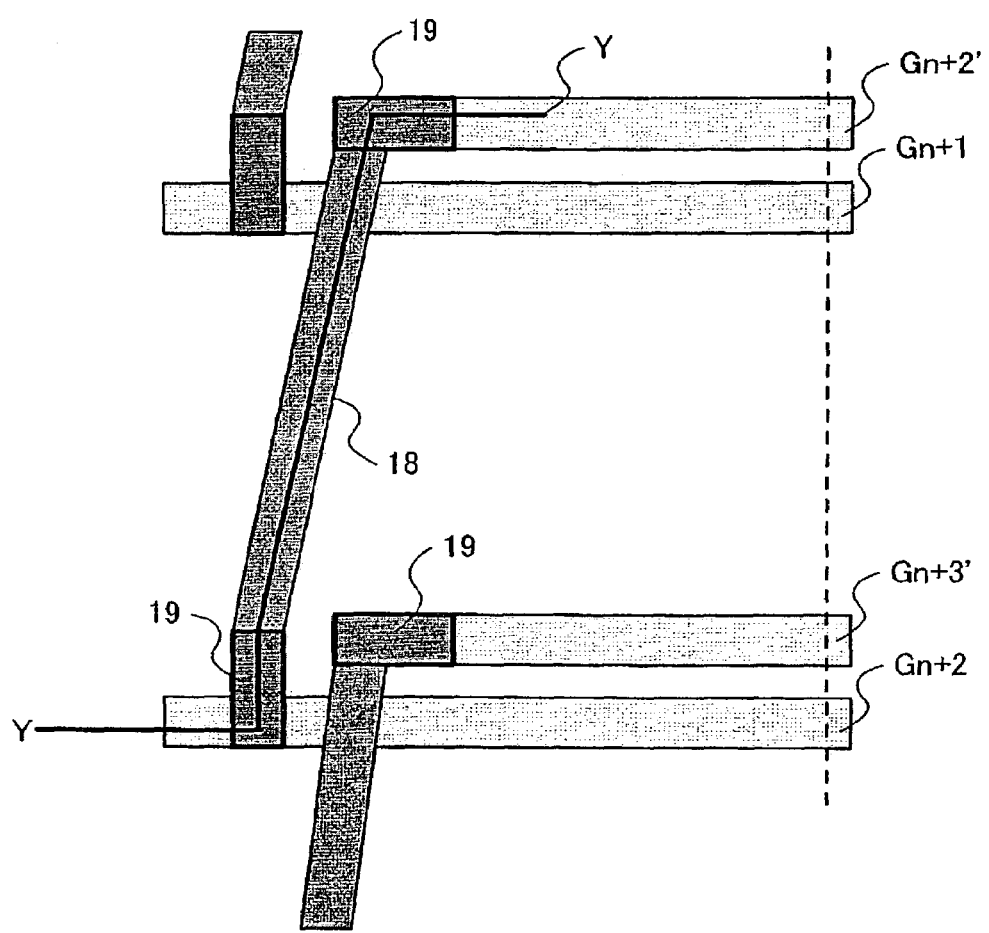
FIG. 6 is a partial plan view of a semiconductor configuration outside a display region of the LCD of FIG. 1.

Next, a description will be made of a portion outside the display region of LCD 2 with reference to FIGS. 6 and 7. FIG. 6 shows the structure in a (rectangular) region surrounded by dotted lines in FIG. 2. As shown in FIG. 6, the two scan signal lines Gn+2 and Gn+2', which supply the same scan signals, are arranged so as to sandwich pixel electrodes C11, D11, C21, D21, . . . therebetween. The two scan signal lines Gn+2 and Gn+2' are electrically connected through a connecting line 18 and connectors 19. This connecting line 18 is formed in the same process step as formation of the source/drain layer 12 shown in FIG. 4 and FIGS. 5(a–e). Meanwhile, because the connectors 19 are formed in the same process step as formation of the pixel electrode 10, the connectors 19 are made of ITO. This is illustrated in FIG. 7 which shows a cross-section taken along the line Y—Y in FIG. 6.

Figure 7:
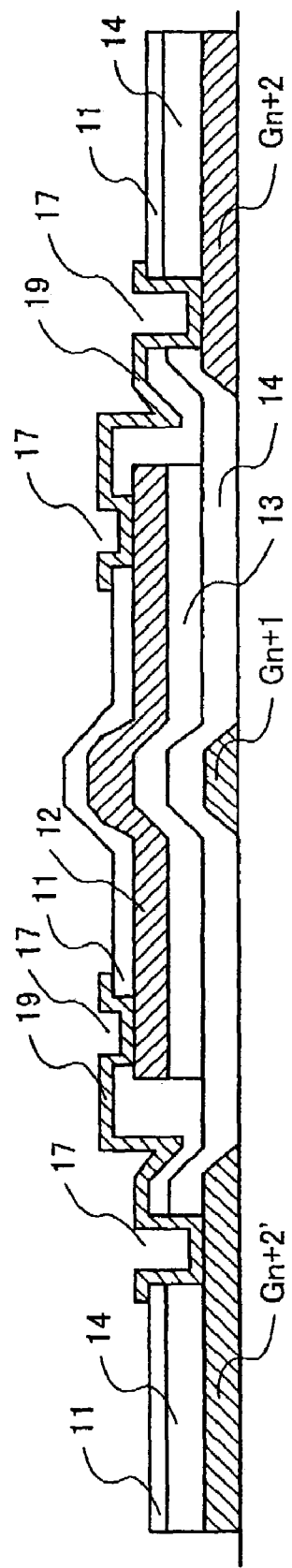
FIG. 7 is a partial cross-sectional view of a semiconductor configuration outside the display region of the LCD of FIG. 1.

As shown in FIG. 7, on the glass substrate 15 (not shown) on which the scan signal lines Gn+1, Gn+2, and Gn+2' are formed, the gate insulating film 14 is formed. Moreover, the semiconductor layer 13 and the source/drain layer 12 which functions as the connecting line 18 are formed in a predetermined region (central portion in the drawing) in which the gate insulating film 14 is formed. The passivation film 11 is formed on the source/drain layer 12 and the gate insulating film 14. The contact holes 17 are formed in the passivation film 11 on the source/drain layer 12. Moreover, also in the gate insulating film 14 and the passivation film 11 on the scan signal lines Gn+2 and Gn+2', the contact holes 17 are formed. The scan signal lines Gn+2 and Gn+2' are electrically connected to the source/drain layer 12 through the connectors 19 entering into the contact holes 17. The passivation film 11 is not formed on the connectors 19 made of ITO. Therefore, the scan signal lines Gn+2 and Gn+2' are exposed outside through the connectors 19.

As described above, in the structure of LCD 2, though the scan signal lines Gn+2 and Gn+2' are exposed outside in a region other than the display region, the gate potential exposure does not occur in the display region. Accordingly, deterioration in image quality due to concentration of impurity ions existing in an LCD is prevented.

Figure 8:
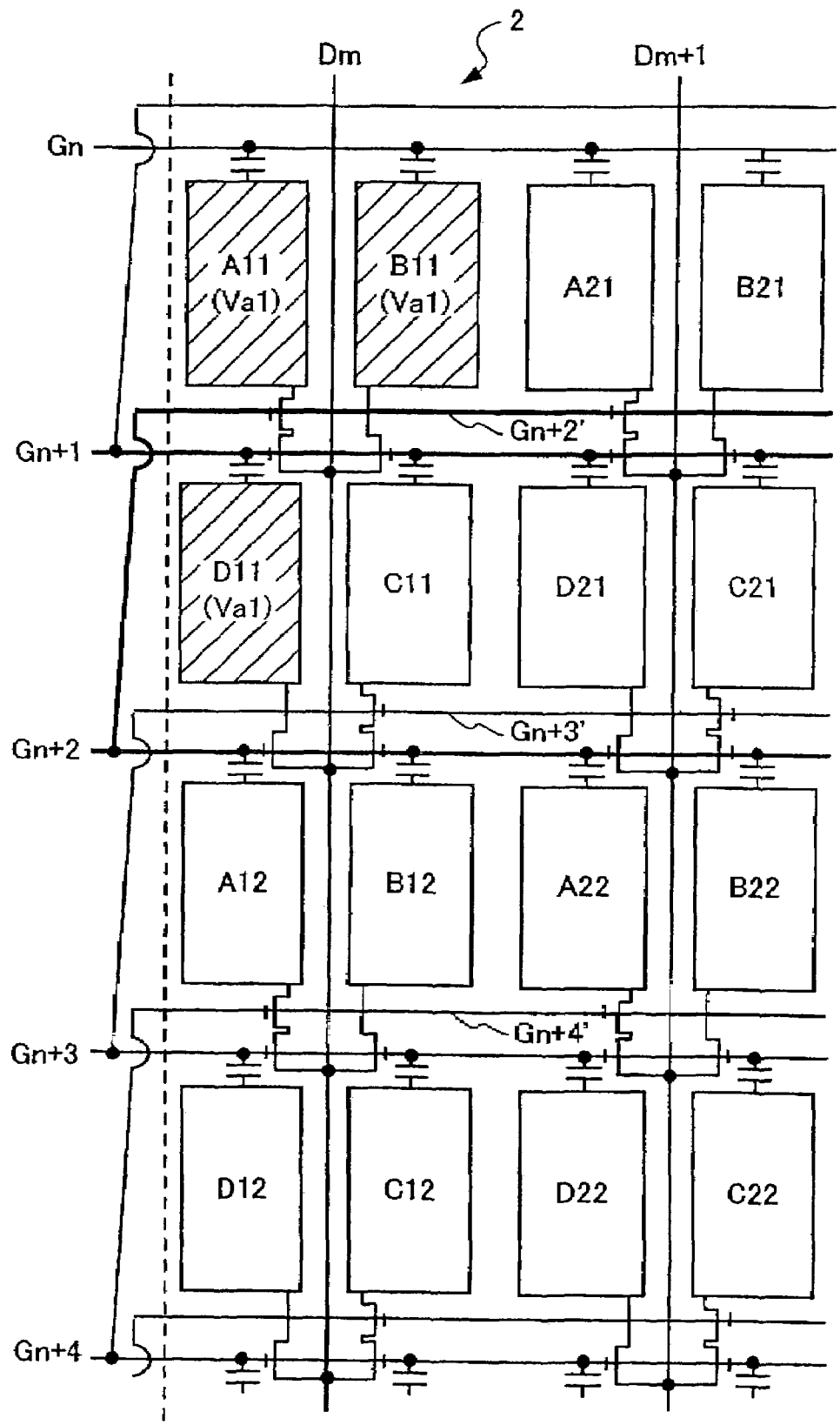
FIG. 8 is a circuit diagram showing operation of the LCD of FIG. 1 in a certain state.
Figure 9:
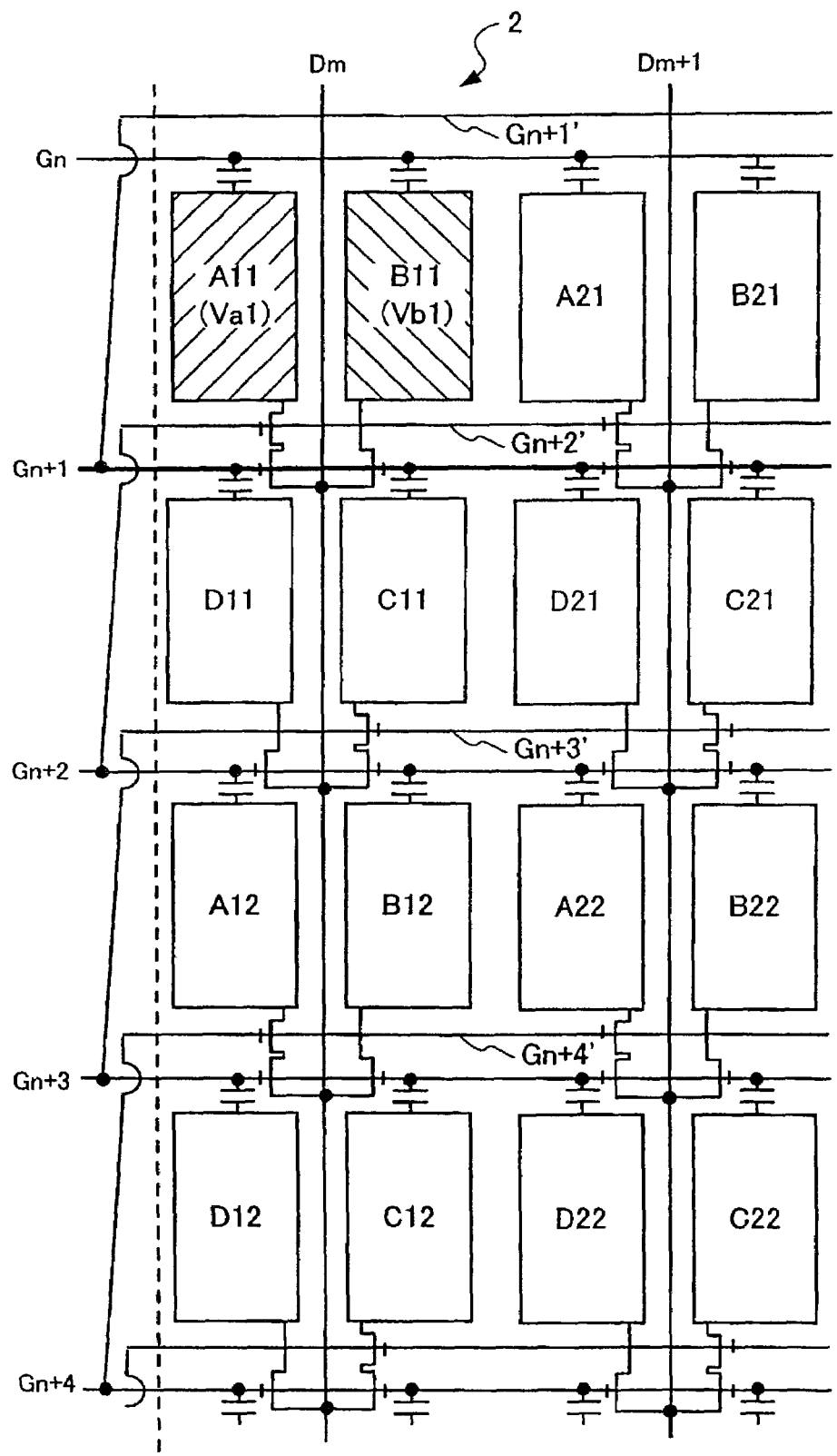
FIG. 9 is a circuit diagram showing operation of the LCD of FIG. 1 in a state subsequent to that of FIG. 8.
Figure 10:
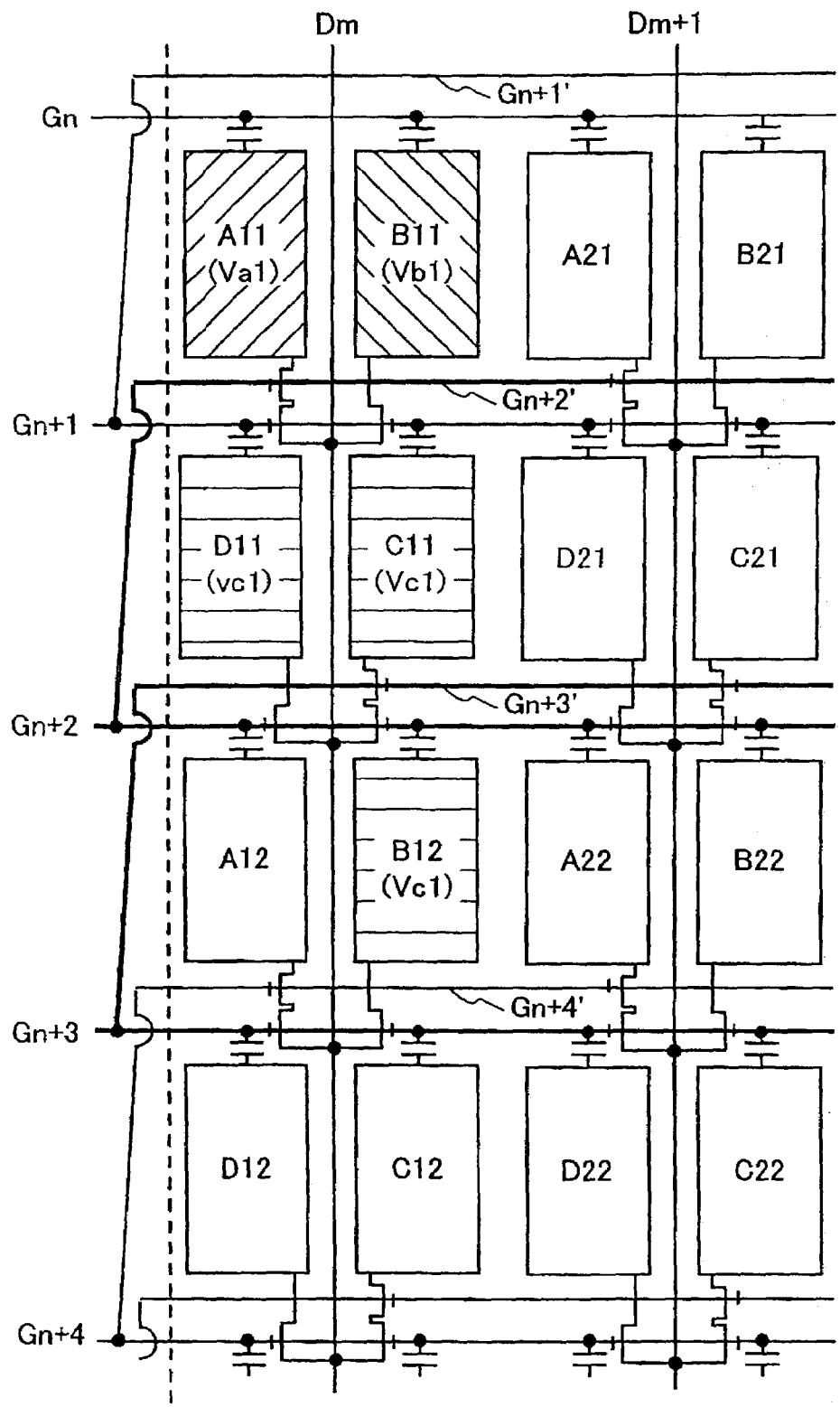
FIG. 10 is a circuit diagram showing operation of the LCD of FIG. 1 in a state subsequent to that of FIG. 9.
Figure 11:
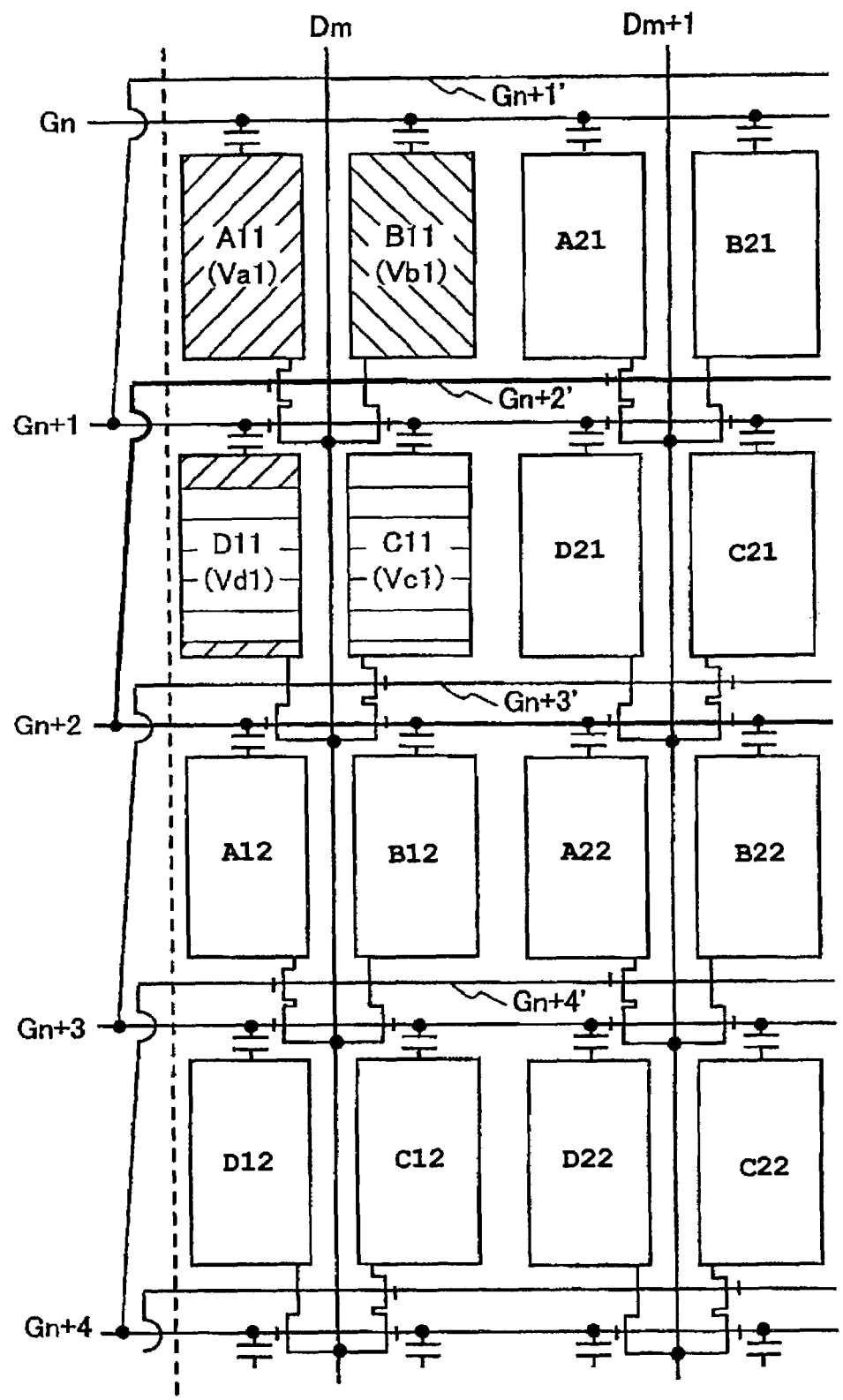
FIG. 11 is a circuit diagram showing operation of the LCD of FIG. 1 in a state subsequent to that of FIG. 10.

Next, referring to an equivalent circuit diagram in FIGS. 8 to 11, a description will be made of operation of pixel electrodes A11 to D11 depending on "selected" or "not-selected" states of the scan signal lines Gn+1 to Gn+3. As shown in FIG. 8, during a period from a time when both of the scan signal lines Gn+1 and Gn+2 are selected to a time when the scan signal line Gn+2 falls to the non-selection potential (hereinafter referred to as "not-selected"), TFTs M1 to M3 are turned on. An electric potential Va1 to be applied to the pixel electrode A11 from the display signal line Dm is written to the pixel electrodes A11, B11, and D11. At this time, the electric potential Va1 of the pixel electrode A11 is determined. Note that in FIG. 8, the selection of the scan signal lines Gn+1, Gn+2 and Gn+2' is indicated by drawing the relevant lines with bold lines. Moreover, hatching is applied to the pixel electrodes to which the electric potential is written. After the scan signal line Gn+2 is set to "not-selected," the electric potential supplied from the display signal line Dm changes to an electric potential Vb1 to be applied to the pixel electrode B11. The scan signal line Gn+1 is still selected during a period after the scan signal line Gn+2 is set to "not-selected," whereby, as shown in FIG. 9, the electric potential Vb1 is written to the pixel electrode B11 and the electric potential of the pixel electrode B11 is determined. As described above, the electric potential of the display signal line Dm is supplied to the pixel electrodes A11 and B11 time-divisionally. Next, after the scan signal line Gn+1 is set to "not-selected," the electric potential of the display signal line Dm changes to an electric potential Vc1 to be applied to the pixel electrode C11. When the scan signal line Gn+2 is selected again and the scan signal line Gn+3 is selected during a period after the scan signal line Gn+1 is set to "not-selected," the electric potential Vc1 is written to the pixel electrodes C11, D11, and B12 as shown in FIG. 10. At this time, the electric potential Vc1 of the pixel electrode C11 is determined. After the scan signal line Gn+3 is set to "not-selected," the electric potential supplied from the display signal line Dm changes to an electric potential Vd1 to be applied to the pixel electrode D11. The scan signal line Gn+2 is still selected during a period after the scan signal line Gn+3 is set to "not-selected," whereby, as shown in FIG. 11, the electric potential Vd1 is written to the pixel electrode D11 and the electric potential of the pixel electrode D11 is determined.

The foregoing describes operations of the pixel electrodes A11, B11, C11, and D11 using the scan signal lines Gn+1 to Gn+3. However, the other pixel electrodes operate similarly.

In the LCD 2, only display signal lines Dm, Dm+1, . . . are arranged between the pixel electrodes A11 and B11, between the pixel electrodes A21 and B21, and the like, that is, between pixel electrodes in the X direction. Meanwhile, in the Y direction, branched scan signal lines and TFTs are arranged. In general, pixel electrodes A11 and the like are long in the Y direction. Therefore, when a structure in which only display signal lines Dm, Dm+1, . . . are arranged in the X direction is adopted similarly to LCD 2, a longitudinal direction of the pixel electrodes A11 and the like can be used effectively for improvement of an aperture ratio.

Figure 12:
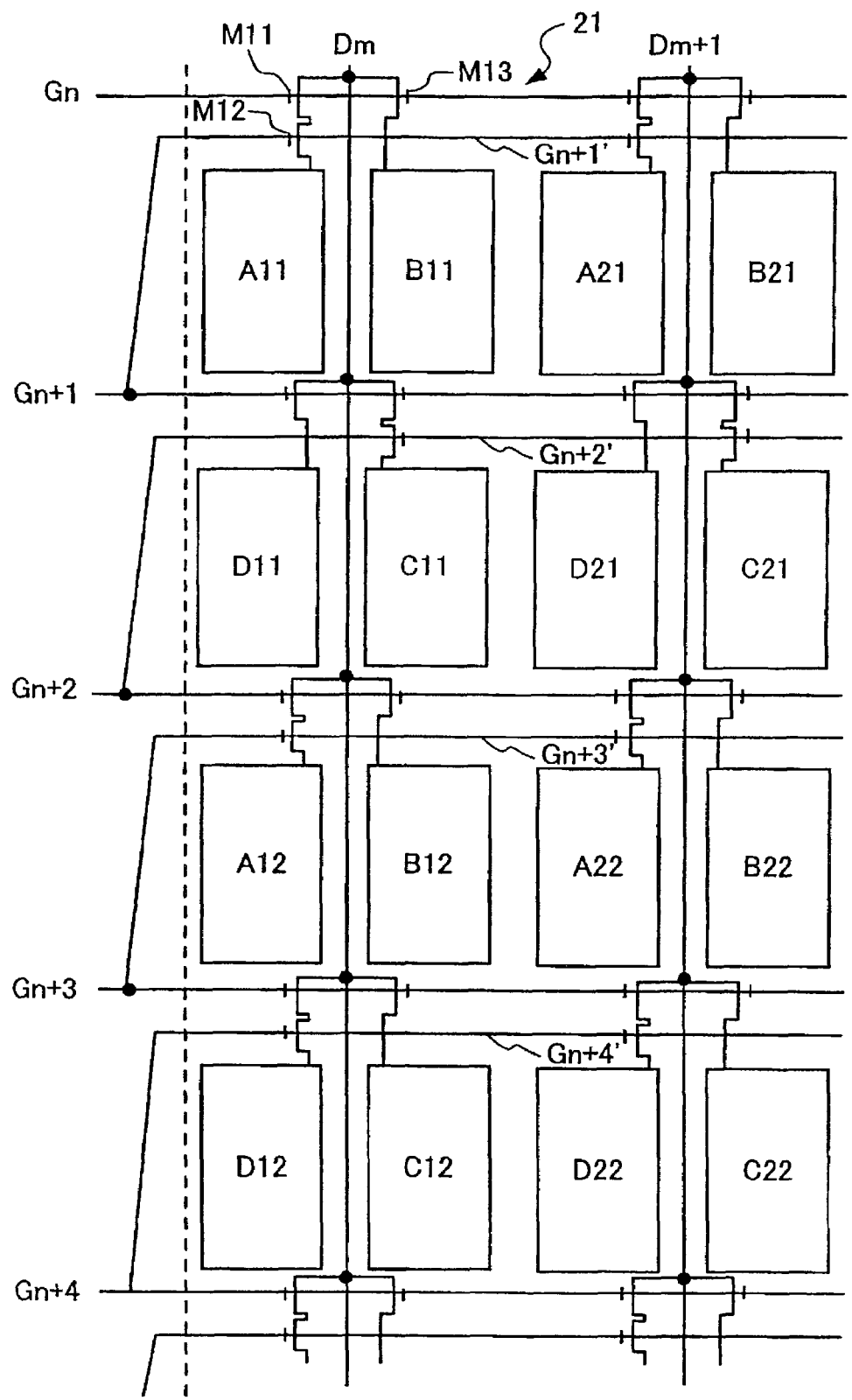
FIG. 12 is a circuit diagram of an LCD according to a second embodiment of the present invention.

FIG. 12 illustrates an LCD 21 according to a second embodiment of the present invention. LCD 21 differs from LCD 2 in that the gate potential exposure does not occur inside or outside the display region of LCD 21. Similar parts of LCDs 2 and 21 will not be described below. Pixel electrodes A11 and B11 of LCD 21 are adjacent to each other across a display signal line Dm. There are three TFTs—M11, M12 and M13, arranged as follows. Source/drain electrodes of TFT M11 are respectively connected to the display signal line Dm and one source/drain electrode of TFT M12. Part of a scan signal line Gn constitutes a gate electrode of TFT M11. Source/drain electrodes of TFT M12 are respectively connected to one source/drain electrode of TFT M11 and the pixel electrode A11. Part of a scan signal line Gn+1' constitutes a gate electrode of TFT M12. The scan signal line Gn+1' is branched from a scan signal line Gn+1. TFTs M11 and M12 have the above-described connection relationship. Accordingly, only during a period when the two adjacent scan signal lines Gn and Gn+1' are simultaneously selected, TFTs M11 and M12 are turned on. Thereby an electric potential of the display signal line Dm is supplied to the pixel electrode A11. Source/drain electrodes of TFT M13 are respectively connected to the display signal line Dm and the pixel electrode B11. Part of the scan signal line Gn constitutes a gate electrode of TFT M13. Accordingly, during a period when the scan signal line Gn is selected, TFT M13 is turned on and thereby the electric potential of the display signal line Dm is supplied to the pixel electrode B11.

A comparison between FIGS. 12 and 2 illustrates that there is no fundamental difference between a connection configuration of TFT M11, TFT M12 and TFT M13 to the pixel electrodes A11 and B11 in LCD 21 and a connection configuration of TFT M1, TFT M2 and TFT M3 to the pixel electrodes A11 and B11 in LCD 2. Therefore, it follows that in the display device 21, the gate potential exposure does not occur in the display region. However, there is a difference between LCD 2 and LCD 21 as follows. In LCD 2, TFTs M1 and M2 are respectively formed on the two scan signal lines Gn+1 and Gn+2' located downstream of the pixel electrode A11 in the scan direction. The scan signal line Gn+2' branched from the scan signal line Gn+2 located downstream of the scan signal line Gn+1 is connected to TFT M2 which is closer to the pixel electrode A11. The scan signal line Gn+1 is connected to TFT M1 which is farther from the pixel electrode A11. Therefore, the scan signal line Gn+1 intersects with the scan signal line Gn+2'. This intersection portion causes the gate potential exposure outside the display region, which has already been described. On the other hand, in LCD 21, the scan signal line Gn located upstream of the pixel electrode A11 in the scan direction and the scan signal line Gn+1' branched from the scan signal line Gn+1 located downstream of the pixel electrode A11 in the scan direction constitute the gate electrodes of TFTs M11 and M12, respectively. The scan signal line Gn+1' located downstream of the scan signal line Gn is connected to TFT M12, which is closer to the pixel electrode A11. The scan signal line Gn is connected to TFT M11, which is farther from the pixel electrode A11. Therefore, as shown in FIG. 12, an intersection portion does not exist between the scan signal line Gn and the scan signal line Gn+1 including the branched line. Accordingly, in LCD 21, the gate potential exposure does not occur even outside the display region (or inside the display region).

Figure 13:
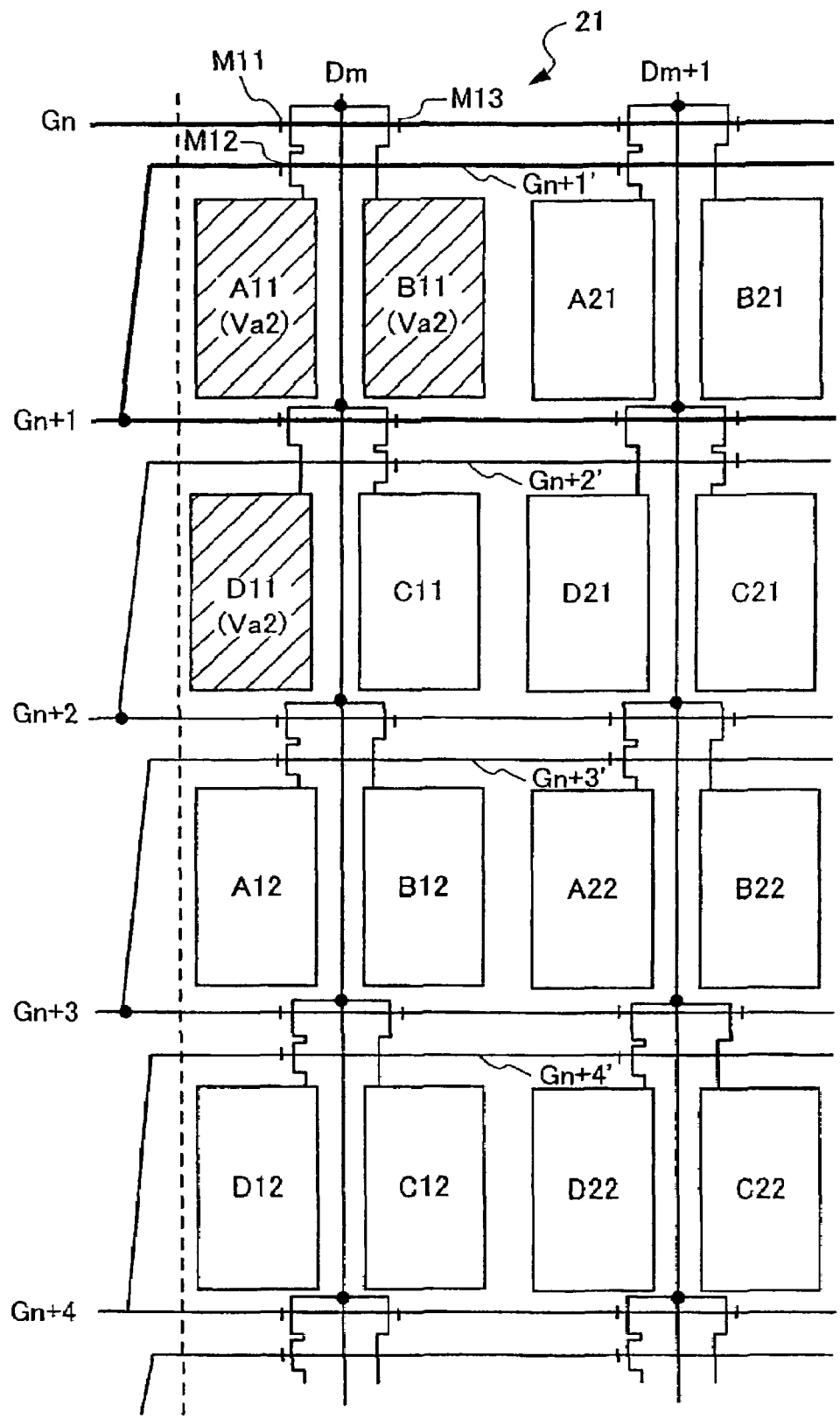
FIG. 13 is a circuit diagram showing operation of the LCD of FIG. 12 in a certain state.
Figure 14:
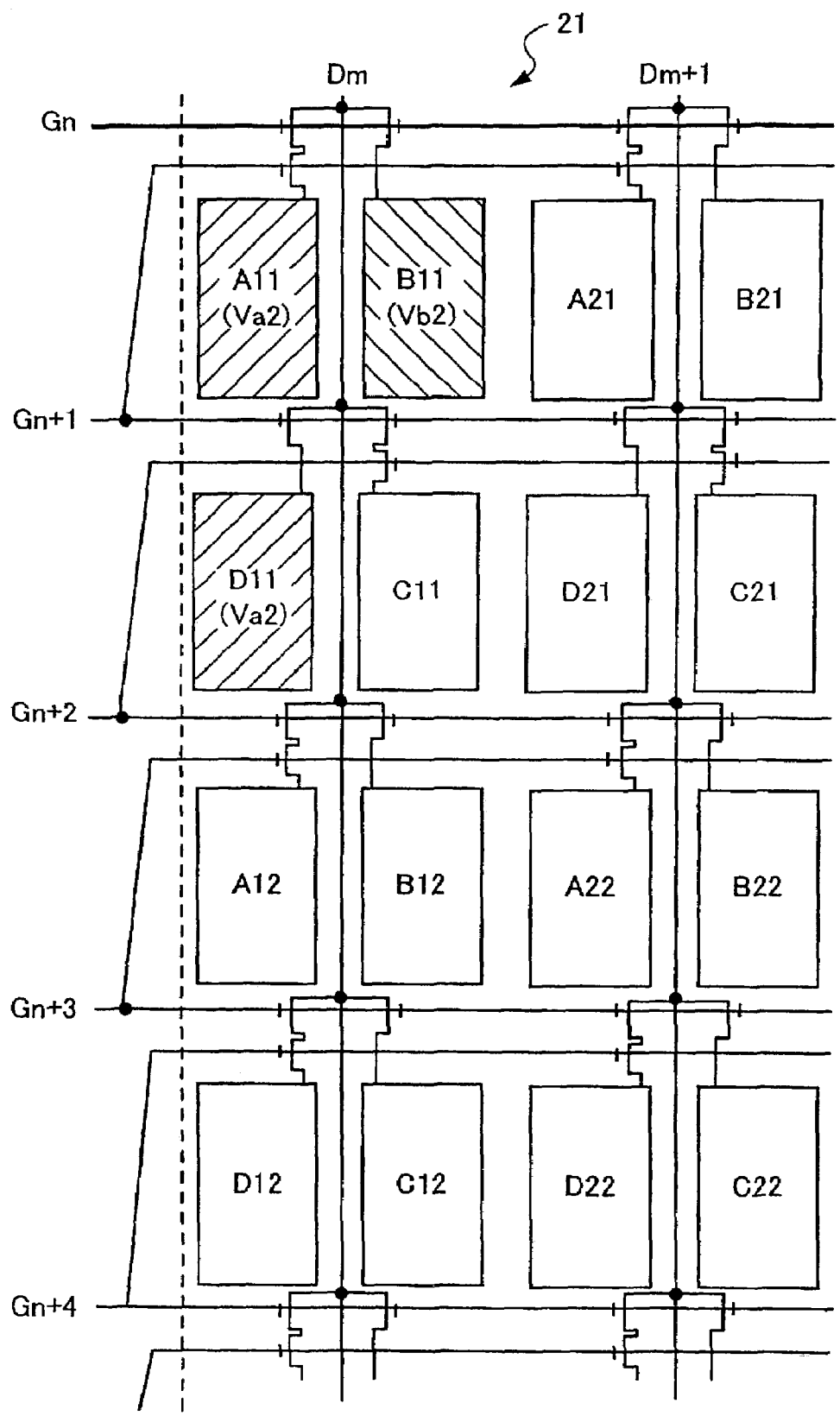
FIG. 14 is a circuit diagram showing operation of the LCD of FIG. 12 in a state subsequent to that of FIG. 13.
Figure 15:
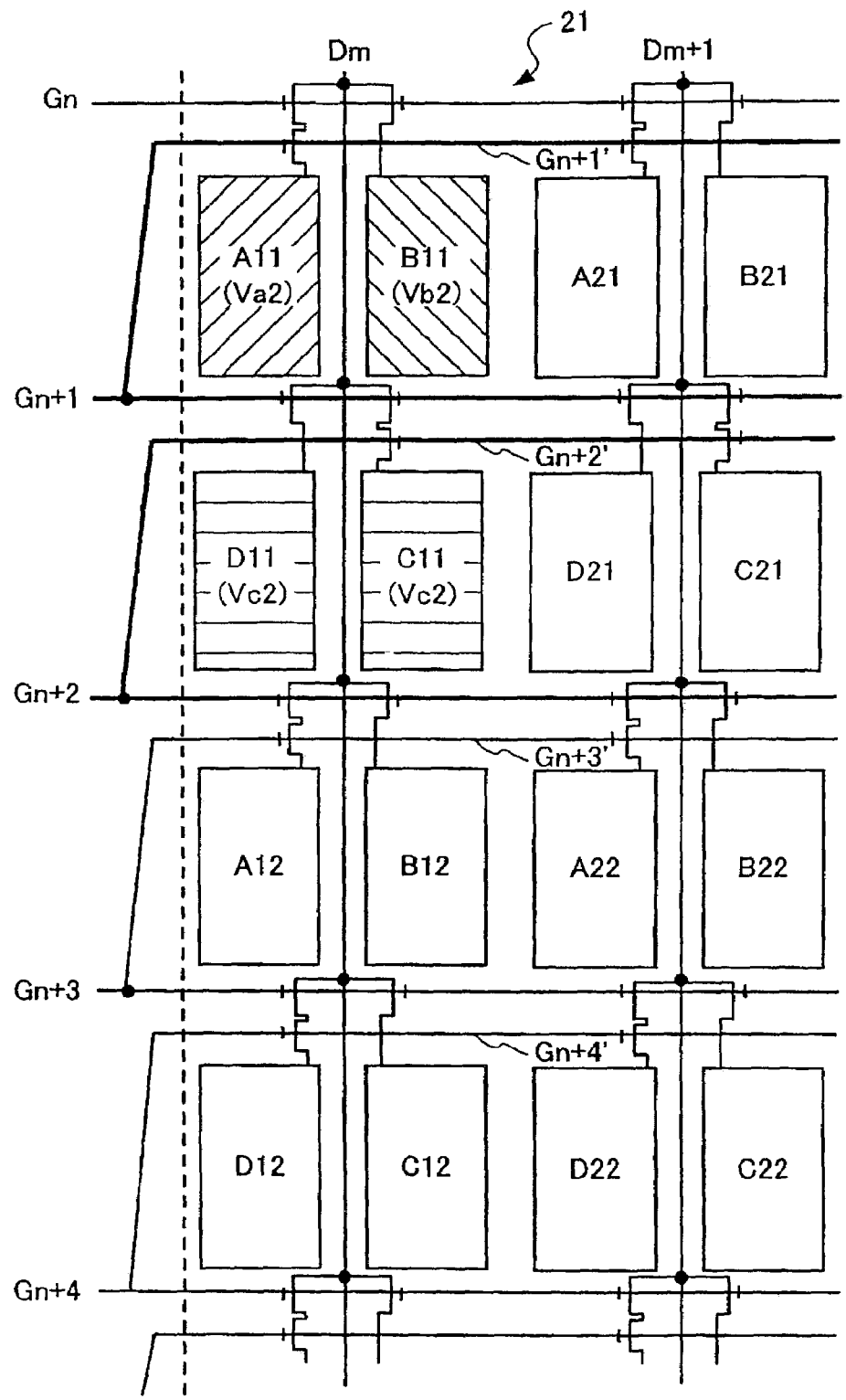
FIG. 15 is a circuit diagram showing operation of the LCD of FIG. 12 in a state subsequent to that of FIG. 14.
Figure 16:
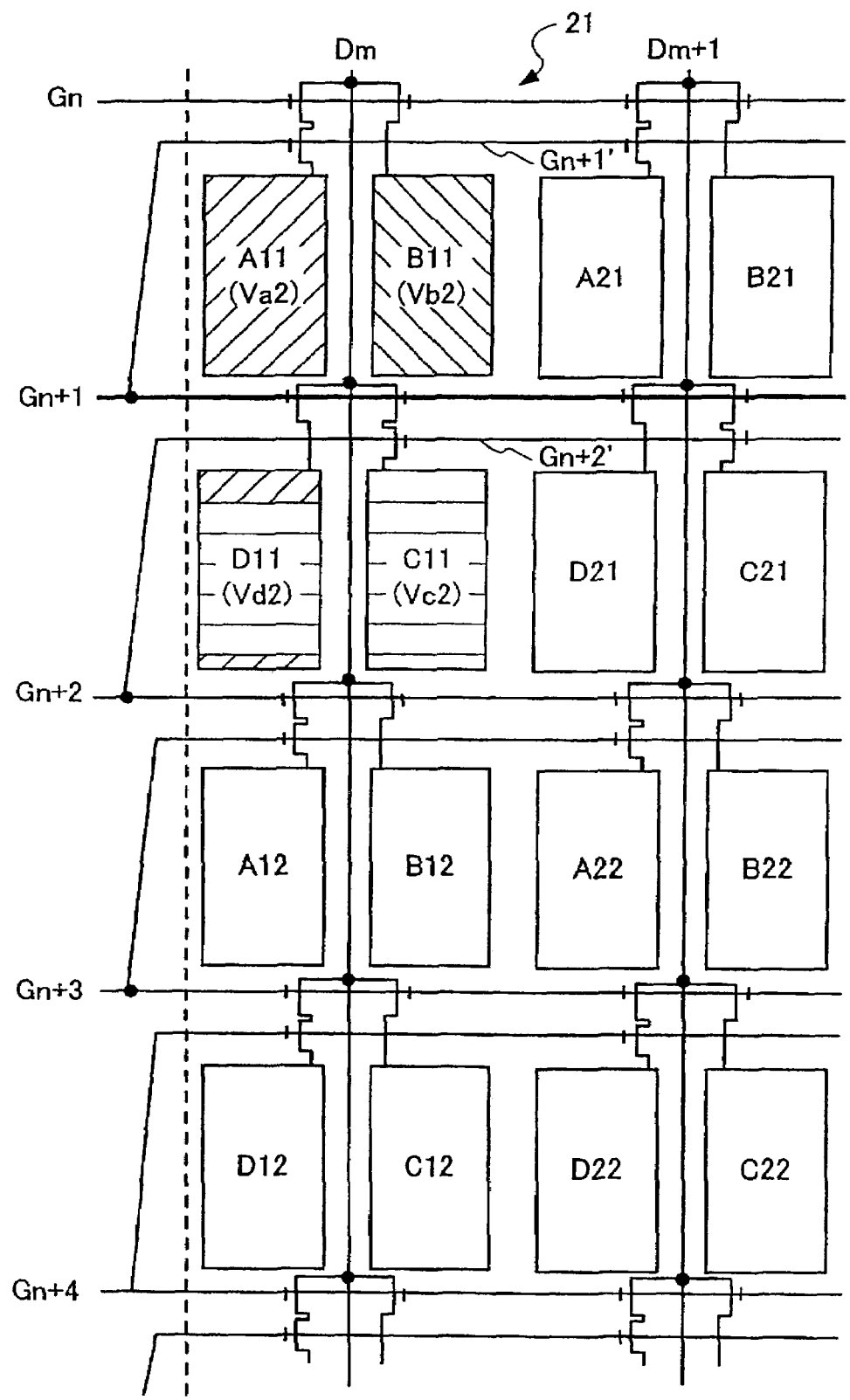
FIG. 16 is a circuit diagram showing operation of the LCD of FIG. 12 in a state subsequent to that of FIG. 15.
Figure 17:
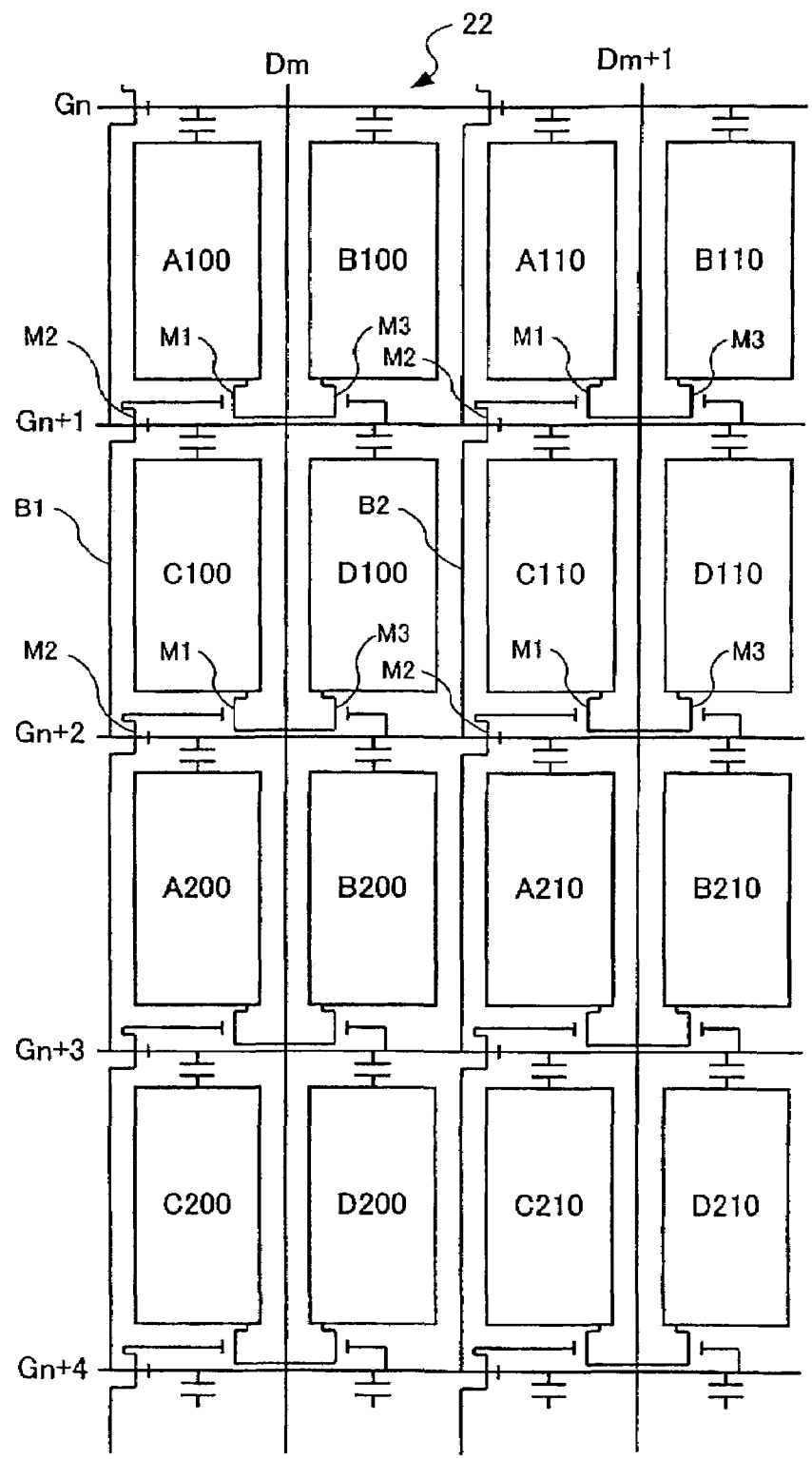
FIG. 17 is a circuit diagram of an LCD according to the prior art.
Figure 18:
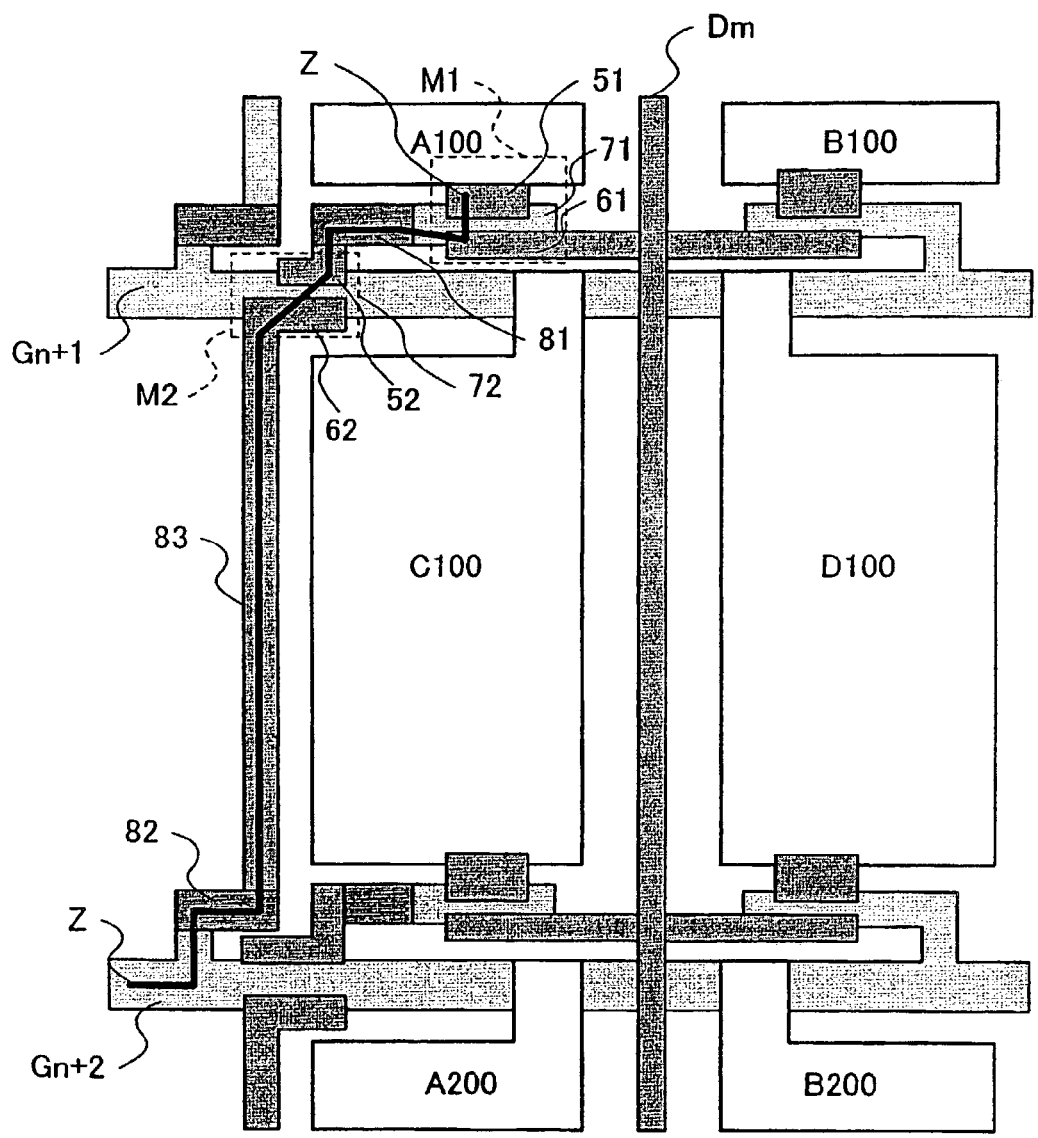
FIG. 18 is a partial plan view of a semiconductor configuration of the LCD of FIG. 17, according to the prior art.
Figure 19:
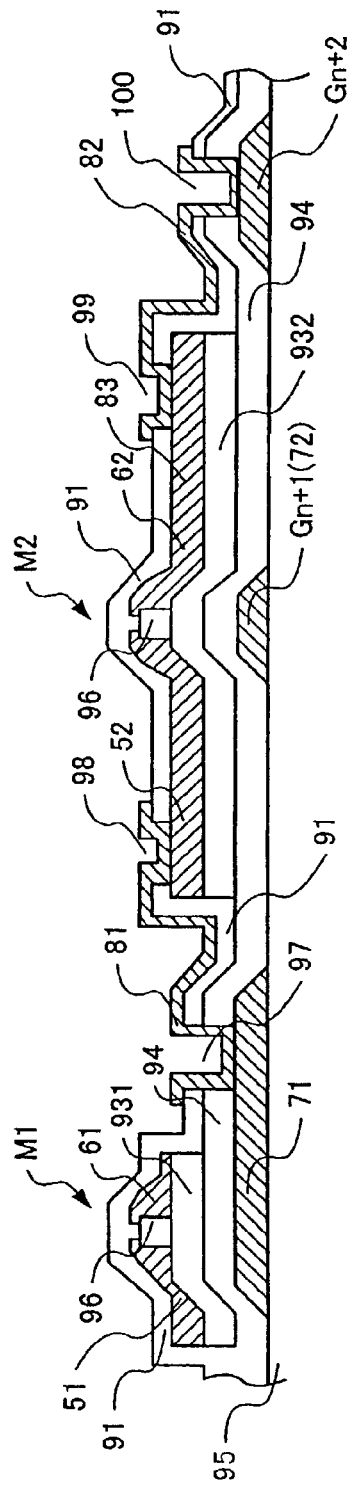
FIG. 19 is a partial cross-sectional view showing the semiconductor configuration of the LCD of FIG. 18, according to the prior art.
Figure 20:
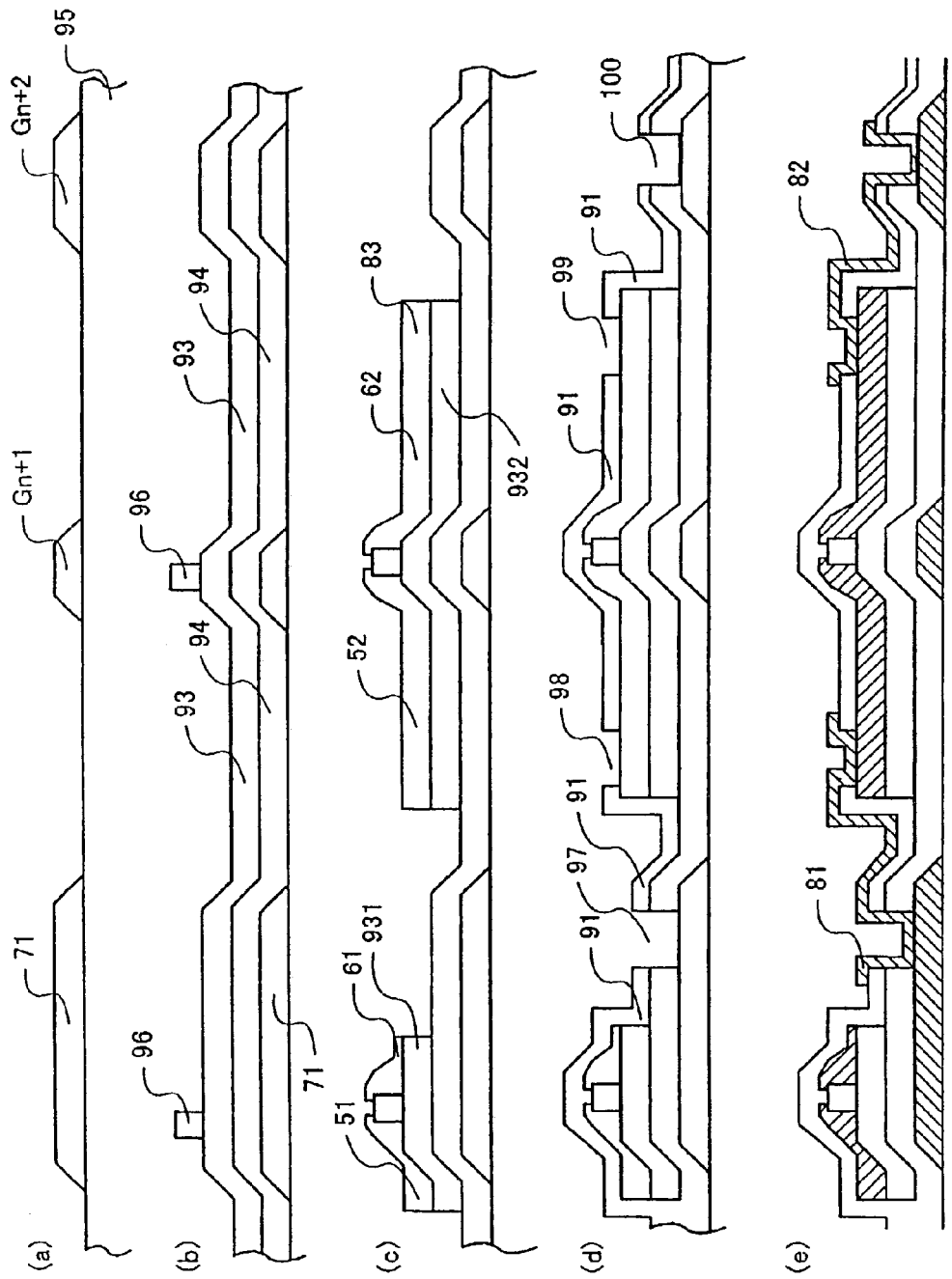
FIGS. 20(*a–e*) shows steps of a manufacturing process of the LCD of FIG. 18, according to the prior art.

Next, operation of LCD 21 will be briefly described with reference to FIGS. 13 to 16. Note that FIGS. 13 to 16 illustrate only operations of the pixel electrodes A11, B11, C11, and D11 using the scan signal lines Gn to Gn+2. As shown in FIG. 13, during a period from a time when both of the scan signal lines Gn and Gn+1 are selected to a time when the scan signal line Gn+1 is set to "not-selected," TFTs M11 to M13 are turned on. Therefore, as shown in FIG. 13, an electric potential Va2 to be applied from the display signal line Dm to the pixel electrode A11 is written to the pixel electrodes A11, B11, and D11. At this time, the electric potential Va2 of the pixel electrode A11 is determined. After the scan signal line Gn+1 is set to "not-selected," the electric potential supplied from the display signal line Dm changes to an electric potential Vb2 to be applied to the pixel electrode B11. The scan signal line Gn is still selected during a period after the scan signal line Gn+1 is set to "not-selected," whereby, as shown in FIG. 14, the electric potential Vb2 is written to the pixel electrode B11 and the electric potential of the pixel electrode B11 is determined. As described above, the electric potential of the display signal line Dm is supplied to the pixel electrodes A11 and B11 time-divisionally. After the scan signal line Gn is set to "not-selected," the electric potential of the display signal line Dm changes to an electric potential Vc2 to be applied to the pixel electrode C11. When the scan signal line Gn+1 is selected again and the scan signal line Gn+2 is also selected during a period after the scan signal line Gn is set to "not-selected," the electric potential Vc2 is written to the pixel electrodes C11 and D11 as shown in FIG. 15. At this time, the electric potential Vc2 of the pixel electrode C11 is determined. After the scan signal line Gn+2 is turned to "not-selected," the electric potential supplied from the display signal line Dm changes to an electric potential Vd2 to be applied to the pixel electrode D11. The scan signal line Gn+1 is still selected during a period after the scan signal line Gn+2 is set to "not-selected," whereby, as shown in FIG. 16, the electric potential Vd2 is written to the pixel electrode D11 and the electric potential of the pixel electrode D11 is determined.

As described above, in LCDs 2 and 21, the gate potential exposure is avoided inside the display region, and in the case of LCD 21 outside the display region as well. Accordingly, deterioration in image quality due to concentration of impurity ions in a liquid crystal is prevented. Moreover, two pixels adjacent to each other across one common display signal line share the display signal line, whereby the number of display signal lines can be reduced by half.

Although the preferred embodiments of the present invention have been described in detail, it should be understood that various changes, substitutions and alternations can be made therein without departing from spirit and scope of the inventions as defined by the appended claims.

The invention claimed is:

1. An LCD comprising:
   a substrate;
   a first gate electrode of a first TFT and a second gate electrode of a second TFT, said first and second gate electrodes adjacent to other on said substrate;
   an insulating film formed over said first and second gate electrodes;
   a semiconductor layer formed on said insulating film, said semiconductor layer extending continuously from a first location on one side of said first gate electrode opposite said second gate electrode to a second location on one side of said second gate electrode opposite said first gate electrode;
   a first source/drain electrode for said first TFT opposite said second TFT, a second source/drain electrode for said second TFT opposite said first TFT, and a third source/drain electrode between and common to both said first and second TFTs, said first, second and third source/drain electrodes being formed on said semiconductor layer;

a passivation layer formed on (i) said first, second and third source/drain electrodes, (ii) a region of said insulating layer peripheral to said first and second TFTs, and (iii) a side edge of said first source/drain electrode peripheral to said first TFT; said passivation layer having a gap over a region of said first source/drain electrode peripheral of said first gate; and a pixel electrode formed on (a) a first portion of said passivation layer which is formed on said insulating layer, (b) a second portion of said passivation layer which is formed on said side edge and (c) said first source/drain electrode through said gap in said passivation layer.

2. An LCD as set forth in claim 1 further comprising means for supplying control signals to said first and second gate electrodes.

3. An LCD comprising:
a substrate;
a first gate electrode of a first TFT and a second gate electrode of a second TFT, said first and second gate electrodes adjacent to other on said substrate;
an insulating film formed over said first and second gate electrodes;
a semiconductor layer formed over said insulating film, said semiconductor layer extending continuously from a first location on one side of said first gate electrode opposite said second gate electrode to a second location on one side of said second gate electrode opposite said first gate electrode;
a first source/drain electrode for said first TFT opposite said second TFT, a second source/drain electrode for said second TFT opposite said first TFT, and a third source/drain electrode between and common to both said first and second TFTs, said first, second and third source/drain electrodes being formed on said semiconductor layer;
a passivation layer formed on said first, second and third source/drain electrodes, said passivation layer having a gap over a region of said first source/drain electrode peripheral of said first gate; and a pixel electrode formed on (a) a first portion of said passivation layer which is formed on said first source/drain electrode peripheral of said first gate and (c) said first source/drain electrode through said gap in said passivation layer.

4. An LCD as set forth in claim 3 further comprising means for supplying control signals to said first and second gate electrodes.

5. An LCD as set forth in claim 3 wherein said semiconductor layer extends homogeneously from said first location on one side of said first gate electrode opposite said second gate electrode to said second location on one side of said second gate electrode opposite said first gate electrode.

6. An LCD as set forth in claim 3 wherein said semiconductor layer is composed of a substantially same material from said first location on one side of said first gate electrode opposite said second gate electrode to said second location on one side of said second gate electrode opposite said first gate electrode.

7. An LCD as set forth in claim 3 wherein said semiconductor layer comprises amorphous silicon.

8. An LCD as set forth in claim 1 wherein said semiconductor layer extends homogeneously from said first location on one side of said first gate electrode opposite said second gate electrode to said second location on one side of said second gate electrode opposite said first gate electrode.

9. An LCD as set forth in claim 1 wherein said semiconductor layer is composed of a substantially same material from said first location on one side of said first gate electrode opposite said second gate electrode to said second location on one side of said second gate electrode opposite said first gate electrode.

10. An LCD as set forth in claim 1 wherein said semiconductor layer comprises amorphous silicon.

* * * * *